(12) United States Patent
Smith et al.

(10) Patent No.: US 9,971,063 B2
(45) Date of Patent: May 15, 2018

(54) BROADBAND METAMATERIAL APPARATUS, METHODS, SYSTEMS, AND COMPUTER READABLE MEDIA

(75) Inventors: David R. Smith, Durham, NC (US); Ruopeng Liu, Shenzhen (CN); Qiang Cheng, Nanjing (CN); Yao Qin, Stuttgart (DE); Tie Jun Cui, Nanjing (CN)

(73) Assignee: Duke University, Durham, NC (US)

( * ) Notice: Subject to any disclaimer, the term of this patent is extended or adjusted under 35 U.S.C. 154(b) by 316 days.

(21) Appl. No.: 12/688,656

(22) Filed: Jan. 15, 2010

(65) Prior Publication Data

US 2010/0225562 A1    Sep. 9, 2010

Related U.S. Application Data

(60) Provisional application No. 61/205,429, filed on Jan. 15, 2009, provisional application No. 61/232,400, filed on Aug. 7, 2009.

(51) Int. Cl.
*H01Q 15/02* (2006.01)
*G02B 1/00* (2006.01)
*B82Y 20/00* (2011.01)

(52) U.S. Cl.
CPC ............ *G02B 1/007* (2013.01); *B82Y 20/00* (2013.01); *H01Q 15/02* (2013.01)

(58) Field of Classification Search
CPC ... H01C 15/02; H01C 15/006–15/0086; H01C 19/06–19/09; G02B 1/007
USPC .......... 343/700 MS, 753, 754, 755, 876, 909
See application file for complete search history.

(56) References Cited

U.S. PATENT DOCUMENTS

| | | | |
|---|---|---|---|
| 5,029,306 A * | 7/1991 | Bull | H01Q 3/2676 342/368 |
| 7,006,052 B2 * | 2/2006 | Delgado et al. | 343/872 |
| 7,015,865 B2 * | 3/2006 | Isaacs et al. | 343/757 |
| 7,538,946 B2 | 5/2009 | Smith et al. | |
| 7,629,941 B2 * | 12/2009 | Pendry et al. | 343/851 |

(Continued)

FOREIGN PATENT DOCUMENTS

WO    WO 2006023195 A2 *    3/2006    ............ B82Y 20/00

OTHER PUBLICATIONS

Notification of Transmittal of the International Search Report and the Written Opinion of the International Searching Authority, or the Declaration for International Application No. PCT/US2010/021240 (dated Nov. 4, 2010).

(Continued)

*Primary Examiner* — Tho G Phan
*Assistant Examiner* — Patrick Holecek
(74) *Attorney, Agent, or Firm* — Jenkins, Wilson, Taylor & Hunt, P.A.

(57) ABSTRACT

Broadband metamaterial apparatus, methods, systems, and computer readable media are disclosed, as well as exemplary embodiments that provide cloaking, beam steering, and beam focusing. In one exemplary implementation, a broadband interface structure has a front surface region and a back surface region. The broadband interface structure is arranged to provide electromagnetic energy characteristic of an apparent profile of the back surface region substantially different than an actual profile of the back surface region for electromagnetic energy received at the front surface region.

71 Claims, 12 Drawing Sheets

(56) References Cited

U.S. PATENT DOCUMENTS

| | | | | |
|---|---|---|---|---|
| 7,821,473 | B2* | 10/2010 | Justice et al. | 343/909 |
| 7,855,691 | B2* | 12/2010 | Yonak | H01Q 15/08 343/755 |
| 8,125,399 | B2* | 2/2012 | McKinzie | H01Q 9/0407 343/746 |
| 8,803,738 | B2* | 8/2014 | Nguyen | H01Q 15/08 343/700 MS |
| 2008/0024792 | A1 | 1/2008 | Pendry et al. | |
| 2008/0165079 | A1 | 7/2008 | Smith et al. | |
| 2009/0218524 | A1* | 9/2009 | Kare | B82Y 20/00 250/505.1 |

OTHER PUBLICATIONS

Liu et al., "Broadband Ground-Plane Cloak," Science, vol. 323, pp. 366-369 (Jan. 16, 2009).
Leonhardt et al., "Broadband Invisibility by Non-Euclidean Cloaking," Science, vol. 323, pp. 110-112 (Jan. 2, 2009).
Shalaev, "Optical negative-index metamaterials," nature photonics, vol. 1, pp. 41-48 (Jan. 2007).
Pendry et al., "Magnetism from Conductors and Enhanced Nonlinear Phenomena," IEEE Transactions on Microwave Theory and Techniques, vol. 47, No. 11, pp. 2075-2084 (Nov. 1999).
Zhang et al., "Cloaking an object on a dielectric half-space," Optics Express, vol. 16, No. 5, pp. 3161-3166 (Mar. 3, 2008).
Ruan et al., "Ideal Cylindrical Cloak: Perfect but Sensitive to Tiny Perturbations," Physical Review Letters, PRL 99, pp. 113903-1-113903-4 (Sep. 14, 2007).
Zhang et al., "Response of a cylindrical invisibility cloak to electromagnetic waves," Physical Review B, vol. 76, pp. 121101-1-121101-4 (Sep. 4, 2007).
Zolla et al., "Electromagnetic analysis of cylindrical invisibility cloaks and the mirage effect," vol. 32, No. 9, Optics Letters, pp. 1069-1071 (May 1, 2007).
Cai et al., "Optical cloaking with metamaterials," Nature Photonics, vol. 1, pp. 224-227 (Apr. 2, 2007).
Liu et al., "Evanescent-wave amplification studied using a bilayer periodic circuit structure and its effective medium model," Physical Review B, vol. 75, pp. 125118-1-125118-9 (Mar. 27, 2007).
Dolling et al., "Negative-index metamaterial at 780 nm wavelength," Optics Letters, vol. 32, No. 1, pp. 53-55 (Jan. 1, 2007).
Liu et al., "Resonant crystal band gap metamaterials in the microwave regime and their exotic amplification of evanescent waves," Applied Physics Letters, No. 90, 091912 (2007).
Liu et al., "Negative index material composed of electric and magnetic resonators," Applied Physics Letters, No. 90, 263504 (2007).
Chen et al., "Transformation media that rotate electromagnetic fields," Applied Physics Letters, No. 90, 241105 (2007).
Schurig et al., "Metamaterial Electromagnetic Cloak at Microwave Frequencies," Science, vol. 314, pp. 977-980 (Nov. 10, 2006).
Schurig et al., "Calculation of material properties and ray tracing in transformation media," Optics Express, vol. 14, No. 21, pp. 9794-9804 (Oct. 16, 2006).
Milton et al., "On the cloaking effects associated with anomalous localized resonance," Proceedings of the Royal Society A, vol. 462, pp. 3027-3059 (Oct. 8, 2006).
Cummer et al., "Full-wave simulations of electromagnetic cloaking structures," Physical Review E, vol. 74, pp. 036621-1-036621-5 (Sep. 27, 2006).
Justice et al., "Spatial mapping of the internal and external electromagnetic fields of negative index metamaterials," Optics Express, vol. 14, No. 19, pp. 8694-8705 (Sep. 18, 2006).
Varadan et al., "Comparison of Measurement and Simulation of Both Amplitude and Phase of Reflected and Transmitted Fields in Resonant Omega Media," Microwave and Optical Technology Letters, vol. 48, No, 8, pp. 1549-1553 (Aug. 2006).
Simovski, "Local constitutive parameters of metamaterials," e-print arXiv:cond-mat/0606622v1, pp. 1-14 (Jun. 23, 2006).
Pendry et al., "Controlling Electromagnetic Fields," Science, vol. 312, pp. 1780-1782 (Jun. 23, 2006).
Leonhardt, "Optical Conformal Mapping," Science, vol. 312, pp. 1777-1780 (Jun. 23, 2006).
Dolling et al., "Low-loss negative-index matamaterial at telecommunication wavelengths," Optics Letters, vol. 31, No. 12, pp. 1800-1802 (Jun. 15, 2006).
Smith et al., "Homogenization of metamaterials by field averaging (invited paper)," J. Opt. Soc. Am. B, vol. 23, No. 3, pp. 391-403 (Mar. 2006).
Schurig et al., "Electric-field-coupled resonators for negative permittivity metamaterials," Applied Physics Letters, No. 88, pp. 041109-1-041109-3 (2006).
Liu et al., "Experimental observation of evanescent-wave amplification and propagation in microwave regime," Applied Physics Letters, No. 89, 221919 (2006).
Leonhardt et al., "General relativity in electrical engineering," New Journal of Physics, vol. 8, No. 247, pp. 1-18 (2006).
Driscoll et al., "Free-space microwave focusing by a negative-index gradient lens," Applied Physics Letters, No. 88, 081101 (2006).
Shalaev et al., "Negative index of refraction in optical metamaterials," Optics Letters, vol. 30, No. 24, pp. 3356-3358 (Dec. 15, 2005).
Alù et al., "Achieving transparency with plasmonic and metamaterial coatings," Physical Review E, vol. 72, pp. 016623-1-016623-9 (Jul. 26, 2005).
Zhang et al., "Near-infrared double negative metamaterials," Optics Express, vol. 13, No. 13, pp. 4922-4930 (Jun. 27, 2005).
Smith et al., "Electromagnetic parameter retrieval from inhomogeneous metamaterials," Physical Review E, vol. 71, pp. 036617-1-036617-11 (Mar. 22, 2005).
Smith et al., "Gradient index metamaterials," Physical Review E, vol. 71, pp. 036609-1-036609-6 (Mar. 17, 2005).
Greegor et al., "Simulation and testing of a graded negative index of refraction lens," Applied Physics Letters, No. 87, 091114 (2005).
Linden et al., "Magnetic Response of Metamaterials at 100 Terahertz," Science, vol. 306, pp. 1351-1353 (Nov. 19, 2004).
He et al., "Focusing properties of a photonic crystal slab with negative refraction," Physical Review B, vol. 70, pp. 115113-1-115113-10 (Sep. 30, 2004).
Smith et al., "Enhanced Diffraction from a Grating on the Surface of a Negative-Index Metamaterial," Physical Review Letters, vol. 93, No. 13, pp. 137405-1-137405-4 (Sep. 23, 2004).
Chen et al., "Robust method to retrieve the constitutive effective parameters of metamaterials," Physical Review E, vol. 70, pp. 016608-1-016608-7 (Jul. 26, 2004).
Yen et al., "Terahertz Magnetic Response from Artificial Materials," Science, vol. 303, pp. 1494-1496 (Mar. 5, 2004).
Koschny et al., "Resonant and antiresonant frequency dependence of the effective parameters of metamaterials," Physical Review E, vol. 68, pp. 065602-1-065602-4. (Dec. 15, 2003).
Simovski et al., "Backward Wave Region and Negative Material Parameters of a Structure Formed by Lattices of Wires and Split-Ring Resonators," IEEE Transactions on Antennas and Propagation, vol. 51, No. 10, pp. 2582-2591 (Oct. 2003.)
Houck et al., "Experimental Observations of a Left-Handed Material That Obeys Snell's Law," Physical Review Letters, vol. 90, No, 13, pp. 137401-1-137401-4 (Apr. 4, 2003).
Parazzoli et al., "Experimental Verification and Simulation of Negative Index of Refraction Using Snell's Law," Physical Review Letters, vol. 90, No. 10, pp. 107401-1-107401-4 (Mar. 11, 2003).
Smith et al., "Determination of effective permittivity and permeability of metamaterials from reflection and transmission coefficients," Physical Review B, vol. 65, pp. 195104-1-195104-5 (2002).
Moss et al., "Numerical Studies of Left Handed Metamaterials," Progress In Electromagnetics Research (PIER), vol. 35, pp. 315-334 (2002).
Marqués et al., "Role of bianisotropy in negative permeability and left-handed metamaterials," Physical Review B, vol. 65, pp. 144440-1-144440-6 (2002).
Weiland et al., "Ab initio numerical simulation of left-handed metamaterials: Comparison of calculations and experiments," Journal of Applied Physics, vol. 90, No. 10, pp. 5419-5424 (Nov. 15, 2001).

(56) References Cited

OTHER PUBLICATIONS

Ziolkowski et al., "Wave propagation in media having negative permittivity and permeability," Physical Review E, vol. 64, pp. 056625-1-056625-15 (Oct. 30, 2001).
Shelby et al. "Experimental Veripcation of a Negative Index of Refraction," Science, vol. 292, pp. 77-79 (Apr. 6, 2001).
Pendry, "Negative Refraction Makes a Perfect Lens," Physical Review Letters, vol. 85, No. 18, pp. 3966-3969 (Oct. 30, 2000).
Smith et al., "Negative Refractive Index in Left-Handed Materials," Physical Review Letters, vol. 85, No. 14, pp. 2933-2936 (Oct. 2, 2000).
Smith et al., "Direct calculation of permeability and permittivity for a left-handed metamaterial," Applied Physics Letters, vol. 77, No. 14, pp. 2246-2248 (Oct. 2, 2000).
Smith et al., "Composite Medium with Simultaneously Negative Permeability and Permittivity," Physical Review Letters, vol. 84, No. 18, pp. 4184-4187 (May 1, 2000).
Pendry et al., "Extremely Low Frequency Plasmons in Metallic Mesostructures," Physical Review Letters, vol. 76, No. 25, pp. 4773-4776 (Jun. 17, 1996).
Ward et al., "Refraction and geometry in Maxwell's equations," Journal of Modern Optics, vol. 43, No. 4, pp. 773-793 (1996).
Collin, "Chapter 12: Artificial Dielectrics," Field Theory of Guided Waves, pp. 749-786 (1991).
Landau et al., "Chapter 10: The Propagation of Electromagnetic Waves," Electrodynamics of Continuous Media, 2nd ed., pp. 290-330 (1984).
Veselago et al., "The Electrodynamics of Substances with Simultaneously Negative Values of $\epsilon$ and $\mu$," Soviet Physics Uspekhl, vol. 10, No. 4, pp. 509-514 (Jan.-Feb. 1968).
Rotman, "Plasma Simulation by Artificial Dielectrics and Parallel-Plate Media," IRE Transactions on Antennas and Propagation, AP10, pp. 82-95 (Jan. 1962).
Liu et al, "Broadband Gradient Index Optics Based on Non-Resonant Metamaterials," pp. 1-5 (Apr. 6, 2009).
"Demonstrated," http://www.pratt.duke.edu/news/?id=1629, pp. 1-3 (Jan. 15, 2009).
Kanté et. al., "Controlling plasmon hybridization for negative refraction metamaterials," Physical Review B 79, 075121 (2009).
Rahm et al., "Design of electromagnetic cloaks and concentrators using form-invariant coordinate transformations of Maxwell's equations," Photonics and Nanostructures Fundamentals and Applications, No. 6, pp. 87-95 (2008).
Koschny et al., "Effective Medium Theory of Left-Handed Materials," Physical Review Letters, vol. 93, No. 10, pp. 1-4 (Sep. 3, 2004).
Bracewell et al., "Analogues of An Ionized Medium: Applications to the Ionosphere," Wireless Engineer, vol. 31, No. 12, pp. 320-326 (Dec. 1954).
Schelkunoff et al., "Antennas: Theory and Practice," p. 584 (1952).
"What are Electromagnetic Metamaterials," http://people.ee.duke.edu/~drsmith/about_metamaterials.htm., p. 1 (Publication Date Unknown, downloaded from the Internet May 4, 2009).
Sajuyigbe et al., "Design and Analysis of Three-Dimensionalized ELC Metamaterial Unit Cell," IEEE Antennas and Wireless Propagration Letters, vol. 8, pp. 1268-1271 (2009).

* cited by examiner 7.38 GHz 8.5 GHz 9.99 GHz 11.72 GHz

8 GHz

9 GHz

10 GHz

11 GHz a  b  c d  e  f

BROADBAND METAMATERIAL APPARATUS, METHODS, SYSTEMS, AND COMPUTER READABLE MEDIA

PRIORITY CLAIM

This application claims the benefit of U.S. Provisional Patent Application Ser. No. 61/205,429 filed Jan. 15, 2009; and U.S. Provisional Patent Application Ser. No. 61/232,400 filed Aug. 7, 2009; the disclosures of which are incorporated herein by reference in their entireties.

GOVERNMENT INTEREST

The presently disclosed subject matter was developed with U.S. Government support under Federal Grant number FA9550-06-1-0279. Thus, the U.S. Government has certain rights in the presently disclosed subject matter.

TECHNICAL FIELD

The subject matter described herein relates to metamaterials and cloaking. More specifically, the subject matter relates to broadband metamaterial apparatus, methods, systems, and computer readable media.

BACKGROUND

The possibility of cloaking an object from detection by electromagnetic waves has recently become a topic of considerable interest. Transformation optics is a method for the conceptual design of complex electromagnetic media, offering opportunities for the control of electromagnetic waves. A wide variety of conventional devices can be designed by the transformation optical approach, including beam shifters, beam bends, beam splitters, focusing and collimating lenses, and structures that concentrate electromagnetic waves. Throughout this disclosure, the use of the term "transformation optics" does not imply any limitation with regards to wavelength; a transformation optics device may be operable in wavelength bands that range from radio wavelengths to visible wavelengths and beyond. Moreover, while some exemplary embodiments are designed by a transformation optical approach, other embodiments do not employ a transformation optical approach or do so only partially. Theoretical limitations of the transformation optical approach do not inhere to any embodiments of the broadband metamaterial apparatus, methods, systems, and computer-readable media described herein.

In the transformation optical approach, a transforming from one coordinate system to another can provide an electromagnetic mapping between the two coordinate systems and a set of parameters for the second system that are a function of those of the first system and the transformation. One can envision the transform as a warping of space so as to control the trajectories of light in a desired manner.

As an example of this approach, a cloak can be designed by performing a coordinate transformation that maps the volume of a first three dimensional region (e.g., a sphere having a finite radius) to the volume of a second three dimensional region enclosing a void (e.g., a shell having the same outer radius and a non-zero inner radius).

Waves do not interact with or scatter from the void because it is simply not part of the transformed space. The form invariance of Maxwell's equations implies that the coordinate transformation can instead be applied to the permittivity and permeability tensors, yielding a prescription (e.g., a description of electromagnetic parameters) for a medium that will accomplish the transformed functionality. The resulting medium can be highly complex, anisotropic and with spatial gradients in the components of the permittivity and/or permeability tensors.

Such complicated gradient-index media can be difficult to create with conventional materials but are often easier to build with artificially structured metamaterials, in which spatial variations of the material parameters can be achieved by modifying the physical parameters (such as geometrical parameters) and/or placements of the constituent elements. Previously, metamaterial structures having spatial gradients have been obtained by designing one unit cell at a time until a library of unique metamaterial elements, whose constitutive parameters span the range required by the transformation optical design, is generated. Even so, the large number of elements required in an arbitrary gradient index medium (such as a cloak medium) can represent a substantial computational burden resulting in long design cycles.

SUMMARY

Broadband metamaterial apparatus, methods, systems, and computer readable media are disclosed.

In one exemplary implementation, a broadband interface structure has a front surface region and a back surface region. The broadband interface structure is arranged to provide electromagnetic energy characteristic of an apparent profile of the back surface region substantially different than an actual profile of the back surface region for electromagnetic energy received at the front surface region. In one approach, the broadband interface structure effectively defines a cloak or a cloaked region. The cloaked region may correspond to the region intermediate the apparent profile and the actual profile as provided by the broadband interface structure.

A method for broad band metamaterial including a non-resonant structure is also disclosed. The method includes receiving broadband electromagnetic energy from one or more directions, where the broadband electromagnetic energy is directed toward a physical topography. The broadband electromagnetic energy is transmitted, substantially independently of the one or more directions, in a manner whereby the transmitted broadband electromagnetic energy appears to be returned from an apparent topography different than the physical topography.

In another approach, embodiments provide an apparatus comprising a plurality of non-resonant elements having respective individual electromagnetic responses, the plurality of respective electromagnetic responses providing effective medium parameters, where the effective medium parameters include an effective permittivity that is substantially non-constant over a broadband frequency range, an effective permeability that is substantially non-constant over the broadband frequency range, and an effective refractive index that is substantially constant over the broadband frequency range.

In another approach, embodiments provide an apparatus comprising a plurality of non-resonant elements having respective individual electromagnetic responses, the plurality of respective electromagnetic responses providing effective medium parameters, where the effective medium parameters include an effective permittivity that is substantially non-constant over a broadband frequency range, an effective permeability that is substantially non-constant over the broadband frequency range, and an effective wave impedance that is substantially constant over the broadband frequency range.

In another approach, embodiments provide an apparatus comprising a plurality of elements having respective characteristic resonance frequencies, where the elements are spatially distributed to provide at least one effective medium parameter that is substantially constant over a broadband frequency range substantially different from the respective characteristic resonance frequencies, the at least one effective medium parameter being substantially determined by the respective characteristic resonance frequencies. For example, the broadband frequency range may be substantially less than or substantially greater than the respective characteristic resonance frequencies; or substantially less than some, while substantially greater than others, of the respective characteristic resonance frequencies.

In another approach, embodiments provide an artificially-structured material that includes a spatial distribution of a plurality of non-resonant elements having respective individual electromagnetic responses, the plurality of respective electromagnetic responses providing a spatially-varying effective refractive index, where the spatially-varying effective refractive index is substantially nondispersive over a broadband frequency range. The spatially-varying effective refractive index may be configured, for example, to provide a beam focusing/defocusing apparatus or a beam steering apparatus.

In another approach, embodiments provide an artificially-structured material that includes a plurality of adjustable nonresonant elements having respective adjustable individual responses, the plurality of respective adjustable individual responses providing one or more adjustable effective medium parameters such as effective permittivity, permeability, refractive index, and/or wave impedance. For example, the adjustable nonresonant elements may be adjustable in response to one or more external inputs such as voltage inputs or optical inputs.

In another approach, embodiments provide a method comprising: selecting a pattern of electromagnetic medium parameters (such as permittivity, permeability, refractive index, and/or wave impedance); and determining respective physical parameters for a plurality of nonresonant elements positionable in a spatial arrangement to provide a pattern of effective electromagnetic medium parameters that substantially corresponds to the selected pattern of electromagnetic medium parameters for a broadband frequency range. The method may also include selecting and/or adjusting the spatial arrangement of the plurality of nonresonant elements.

In another approach, embodiments provide a method comprising: selecting an electromagnetic function (such as a beam-steering function, a beam-focusing function, or a cloaking function); and determining respective physical parameters for a plurality of nonresonant elements positionable in a spatial arrangement to provide the electromagnetic function as an effective medium response of the nonresonant elements over a broadband frequency range. The method may also include selecting and/or adjusting the spatial arrangement of the plurality of nonresonant elements.

In another approach, embodiments provide a method comprising: selecting an electromagnetic function; identifying a pattern of electromagnetic medium parameters suitable to provide the electromagnetic function; and determining respective physical parameters for a plurality of nonresonant elements positionable in a spatial arrangement to provide a pattern of effective electromagnetic medium parameters that substantially corresponds to the selected pattern of electromagnetic medium parameters for a broadband frequency range. For example, selecting an electromagnetic function may include selecting or computing a coordinate transformation corresponding to the electromagnetic function; identifying the pattern of electromagnetic medium parameters (such as permittivity and permeability) may include applying equations of transformation optics that relate the coordinate transformation to electromagnetic medium parameters; and determining respective physical parameters for a plurality of nonresonant elements may include performing a regression analysis based upon a sample library of nonresonant element simulations. The method may also include selecting and/or adjusting the spatial arrangement of the plurality of nonresonant elements.

In another approach, embodiments provide a method comprising: selecting a pattern of electromagnetic medium parameters for a broadband frequency range; and, for a plurality of adjustable nonresonant elements having respective adjustable physical parameters and positioned in a spatial arrangement, determining respective values of the respective adjustable physical parameters to provide a pattern of effective electromagnetic medium parameters that substantially corresponds to the selected pattern of electromagnetic medium parameters. Where the respective adjustable physical parameters are determined by one or more control inputs, the method may further include providing the one or more control inputs corresponding to the determined respective values of the respective adjustable physical parameters. The method may also include selecting and/or adjusting the spatial arrangement of the plurality of nonresonant elements.

In another approach, embodiments provide a method comprising: selecting an electromagnetic function (such as a beam-steering function, a beam-focusing function, or a cloaking function); and, for a plurality of adjustable nonresonant elements having respective adjustable physical parameters and positioned in a spatial arrangement, determining respective values of the respective adjustable physical parameters to provide the electromagnetic function as an effective medium response of the nonresonant elements over a broadband frequency range. Where the respective adjustable physical parameters are determined by one or more control inputs, the method may further include providing the one or more control inputs corresponding to the determined respective values of the respective adjustable physical parameters. The method may also include selecting and/or adjusting the spatial arrangement of the plurality of nonresonant elements.

In another approach, embodiments provide a method comprising: selecting an electromagnetic function; identifying a pattern of electromagnetic medium parameters suitable to provide the electromagnetic function; and, for a plurality of adjustable nonresonant elements having respective adjustable physical parameters and positioned in a spatial arrangement, determining respective values of the respective adjustable physical parameters to provide a pattern of effective electromagnetic medium parameters that substantially corresponds to the selected pattern of electromagnetic medium parameters. For example, selecting an electromagnetic function may include selecting or computing a coordinate transformation corresponding to the electromagnetic function; identifying the pattern of electromagnetic medium parameters (such as permittivity and permeability) may include applying equations of transformation optics that relate the coordinate transformation to electromagnetic medium parameters; and determining respective values of the respective adjustable physical parameters may include performing a regression analysis based upon a sample library of nonresonant element simulations. Where the respective adjustable physical parameters are determined by one or more control inputs, the method may further include providing the one or more control inputs corresponding to the determined respective values of the respective adjustable physical parameters. The method may also include selecting and/or adjusting the spatial arrangement of the plurality of nonresonant elements.

In one approach the design of a broadband interface structure described herein uses transformation optics, in which a coordinate transformation is applied to Maxwell's equations to obtain a spatially distributed set of constitutive parameters that define the broadband interface structure. In one approach, the broadband interface structure may define a cloak.

Further, an illustrative experimental realization of a cloak design that conceals a perturbation on a flat conducting plane, under which an object can be hidden, is described herein. In this configuration, the broadband interface structure defines a ground plane cloak. A metamaterial consisting of thousands of elements provides a complex spatial distribution of effective constitutive parameters, the geometry of each element determined by an automated design process. The broadband interface structure can be realized with the use of nonresonant metamaterial elements. The illustrative ground plane cloak example was constructed, and the structure demonstrated an operational bandwidth broader than that of resonant metamaterial structures. One exemplary demonstration provided a range from 13 to 16 GigaHertz) and with extremely low loss. Experimental results indicate that this type of response would scale well toward visible wavelengths.

To address the time-consuming design step of generating metamaterial structures with spatial gradients whose constitutive parameters span the range defined by the transformation, disclosed herein is a systematic algorithm that is applied once the spatial distribution of the constitutive parameters has been determined by the transformation. In contrast to conventional approaches, system and method described herein can employ the regressive algorithmic approach described herein below to generate the functional dependence of the constitutive parameters on the unit cell geometry with a relatively small amount of computational burden as compared to many other approaches. In some cases, however, it may be appropriate to apply a more computationally intensive approach to determine the functional dependence of the constitutive parameters on the unit cell geometry of the metamaterial element. The reduced number of simulations vastly speeds the metamaterial design process and makes the design of complex media more efficient.

In some aspects, the subject matter described herein for abroad band metamaterial including a non-resonant structure, including without limitation a broadband interface structure arranged for cloaking objects, using the metamaterial may be implemented, in part, using a non-transitory computer readable medium having stored thereon executable instructions that when executed by the processor of a computer control the processor to perform steps. Exemplary computer readable media suitable for implementing the subject matter described herein includes disk memory devices, programmable logic devices, and application specific integrated circuits. In one implementation, the computer readable medium may include a memory accessible by a processor. The memory may include instructions executable by the processor for implementing any of the methods for an ultra-broad band metamaterial including a non-resonant structure and cloaking objects using the metamaterial described herein. In addition, a computer readable medium that implements the subject matter described herein may be distributed across multiple physical devices and/or computing platforms.

BRIEF DESCRIPTION OF THE DRAWINGS

The subject matter described herein will now be explained with reference to the accompanying drawings of which.

DETAILED DESCRIPTION

Because the electromagnetic response of metamaterial elements can be precisely defined, and in some configurations, controlled, they can be viewed as the fundamental building blocks for a wide range of complex electromagnetic media. To date, metamaterials have commonly been formed from resonant conducting circuits or other resonant structures, whose dimensions and spacing are much less than the wavelength of operation. By engineering the large dipolar response of these resonant elements, an unprecedented range of effective material response can be realized, including artificial magnetism and large positive and negative values of the effective permittivity and permeability tensor elements.

Leveraging the flexibility inherent in these resonant elements, metamaterials have been used to implement structures that would have been otherwise difficult or impossible to achieve using conventional materials. Negative index materials, for example, sparked a surge of interest in metamaterials, since negative refractive index is not a material property available in nature, except in very special circumstances. Still, as remarkable as negative index media are, they represented only the beginning of the possibilities available with artificially structured media. Inhomogeneous media, in which the electromagnetic properties vary in a controlled manner throughout space, also can be used to develop components for electromagnetic systems such as optical, microwave, and RF systems, and are an extremely good match for implementation by metamaterials. Indeed, gradient index components have already been demonstrated at microwave frequencies in numerous experiments (see for example D. R Smith et al, "Metamaterials," U.S. patent application Ser. No. 11/658,358, herein incorporated by reference). Moreover, since metamaterials allow unprecedented freedom to control the constitutive tensor elements independently, point-by-point throughout a region of space, metamaterials can be used as the technology to realize a range of structures designed by the method of transformation optics. The "invisibility" cloak, demonstrated at microwave frequencies in 2006, is an example of a metamaterials application defined by a transform.

Figure 1:
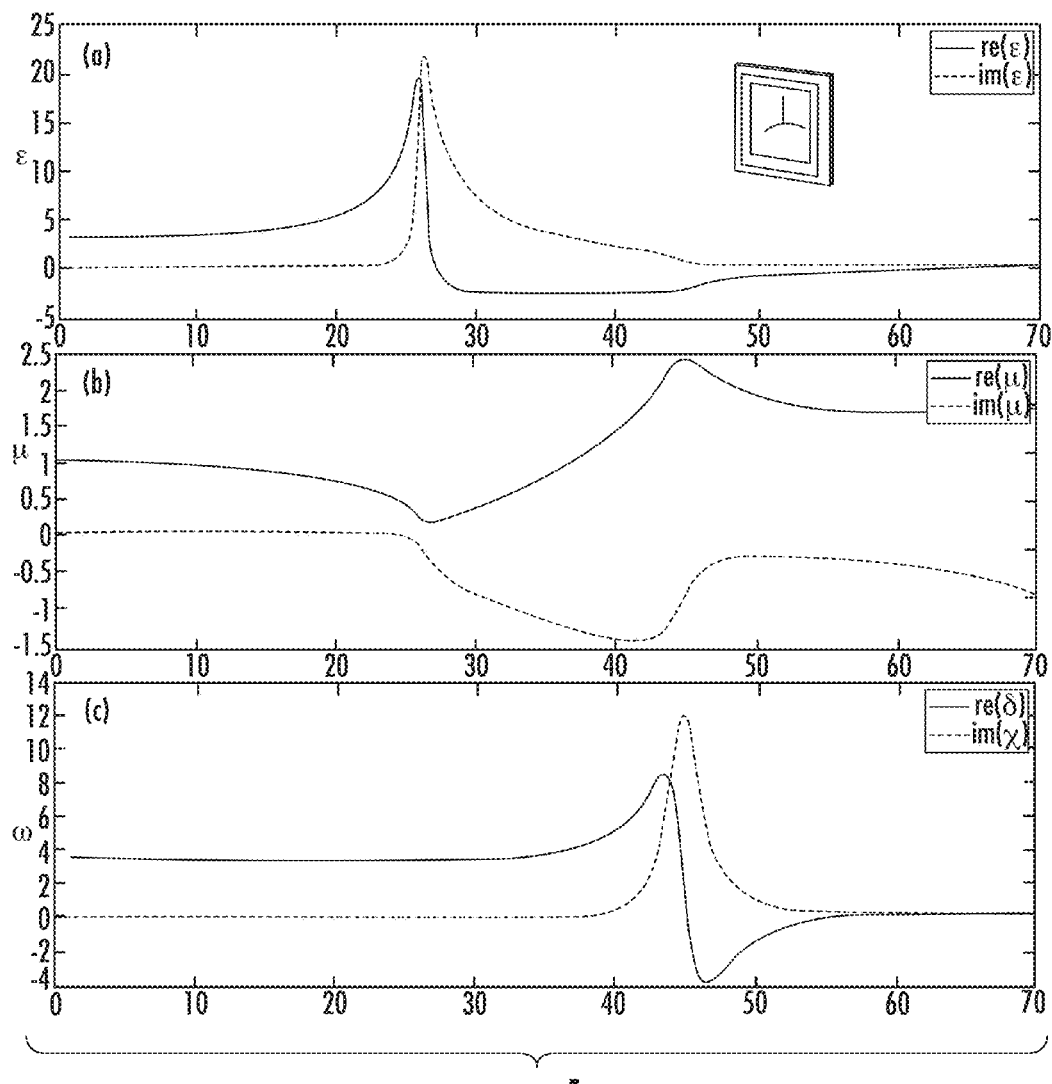
FIG. 1 is a diagram illustrating effective constitutive parameters for a metamaterial unit cell according to an embodiment of the subject matter described herein.

Although metamaterials have proven successful in the realization of unusual electromagnetic responses, the structures demonstrated are often of only limited utility in some practical applications. One aspect that may limit applicability is the large losses that are inherent to many of the resonant elements most typically used. The situation can be illustrated using the curves presented in FIG. 1, in which the effective constitutive parameters are shown in graphs (a) and (b) of FIG. 1 for the metamaterial unit cell in the inset. Specifically, graph (a) of FIG. 1 shows retrieved permittivity for a metamaterial composed of the repeated unit cell shown in the inset; graph (b) of FIG. 1 retrieved permeability for a metamaterial composed of the repeated unit cell shown in the inset; and graph (c) of FIG. 1 shows $\in$ with frequency and the regular Drude-Lorentz resonant form after removing the spatial dispersion factor. According to the effective medium theory described in R. Liu et al, Phys. Rev. E 76, 026606 (2007), which is herein incorporated by reference, the retrieved curves are significantly affected by spatial dispersion effect. The effective medium theory relates the retrieved constitutive parameters ($\in, \mu$) with spatial dispersion to constitutive parameters ($\bar{\in}, \bar{\mu}$) without spatial dispersion according to the equations:

$$\bar{\in} = \in = \sin(\theta)/\theta$$

$$\bar{\mu} = \mu \tan(\theta/2)/(\theta/2) \quad (1)$$

in which $\theta = \omega p \sqrt{\in\mu}$ where p is the periodicity of the unit cell. Note that the unit cell in the illustration possesses a resonance in the permittivity at a frequency near 42 GHz (graph (c) of FIG. 1). In addition to the resonance in the permittivity, there is also structure in the magnetic permeability (graph (b) of FIG. 1). These artifacts are phenomena related to spatial dispersion—an effect due to the finite size of the unit cell with respect to the wavelengths. As previously pointed out, the effects of spatial dispersion can be simply described analytically, and can thus be removed mathematically to reveal a relatively uncomplicated Drude-Lorentz type oscillator characterized by only a few parameters. The determined characterizing resonance takes the form $$\varepsilon(\omega) = 1 - \frac{\omega_p^2}{\omega^2 - \omega_0^2 + i\Gamma\omega} = \frac{\omega^2 - \omega_0^2 - \omega_p^2 - i\Gamma\omega}{\omega^2 - \omega_0^2 + i\Gamma\omega} \quad (2)$$

where $\omega_p$ is the plasma frequency, $\omega_0$ is the resonance frequency and $\Gamma$ is a damping factor. The frequency where $\in(\omega) = 0$ occurs at $\omega_L^2 = \omega_0^2 + \omega_p^2$.

As can be seen from either Equation 2 or FIG. 1, the effective permittivity can achieve very large values, either positive or negative, near the resonance. Yet, these values are often inherently accompanied by both dispersion and relatively large losses, especially for frequencies very close to the resonance frequency. Thus, although a very wide and interesting range of constitutive parameters can be accessed by working with metamaterial elements near the resonance, the advantage of these values can be somewhat tempered by the inherent loss and dispersion. One common strategy for those utilizing metamaterials in this resonant regime is to reduce the losses of the unit cell as much as possible or to provide compensating gain.

If we examine the response of the electric metamaterial shown in FIG. 1 at very low frequencies, we find, in the zero frequency limit, $$\varepsilon(\omega \to 0) = 1 + \frac{\omega_p^2}{\omega_0^2} = \frac{\omega_L^2}{\omega_0^2}. \quad (3)$$

The equation is reminiscent of the Lyddane-Sachs-Teller relation that describes the contribution of the polariton resonance to the dielectric constant at zero frequency. At frequencies far away from the resonance, the permittivity approaches a constant that differs from unity by the square of the ratio of the plasma to the resonance frequencies. Although the values of the permittivity are necessarily positive and greater than unity for this configuration, the permittivity is both dispersionless and lossless—a considerable advantage. Note that this property does not extend to the magnetic response of artificially-magnetic metamaterial media, such as metamaterial media incorporating split ring resonators, which are generally characterized by effective permeability of the form $$\mu(\omega) = 1 - \frac{F\omega^2}{\omega^2 - \omega_0^2 + i\Gamma\omega},\quad (4)$$

in which μ approaches unity in the low frequency limit. Because artificial magnetic effects are based on induction rather than polarization, artificial magnetic response vanishes at zero frequency.

The effective constitutive parameters of metamaterials are not only complicated by spatial dispersion but also possess an infinite number of higher order resonances that can be properly represented as a sum of a set of oscillator responses. It is thus expected that the simple analytical formulas presented above are only approximate.

In one aspect, one can investigate the general trend of the low frequency permittivity as a function of the high-frequency resonance properties of the unit cell. For example, with respect to the illustrative structure of FIG. 4, adjusting the dimension of the square closed ring in the unit cell provides a comparison for the retrieved zero-frequency permittivity with that predicted by Equation 2. The simulations are carried out using a software solver, analyzer, or modeling system, such as HFSS (Ansoft), a commercially available electromagnetic, finite-element, solver that can determine the exact field distributions and scattering (S-) parameters for an arbitrary metamaterial structure. The permittivity and permeability can be retrieved from the S-parameters by a well-established algorithm. Table 1 shown below demonstrates the comparison between such simulated extraction and theoretical prediction. In this comparison, when the unit cell is combined with a dielectric substrate, Equation 3 becomes $$\varepsilon(\omega \to 0) = \varepsilon_a\left(1 + \frac{\omega_p^2}{\omega_0^2}\right) = \varepsilon_a \frac{\omega_L^2}{\omega_0^2},\quad (5)$$

Figure 4:
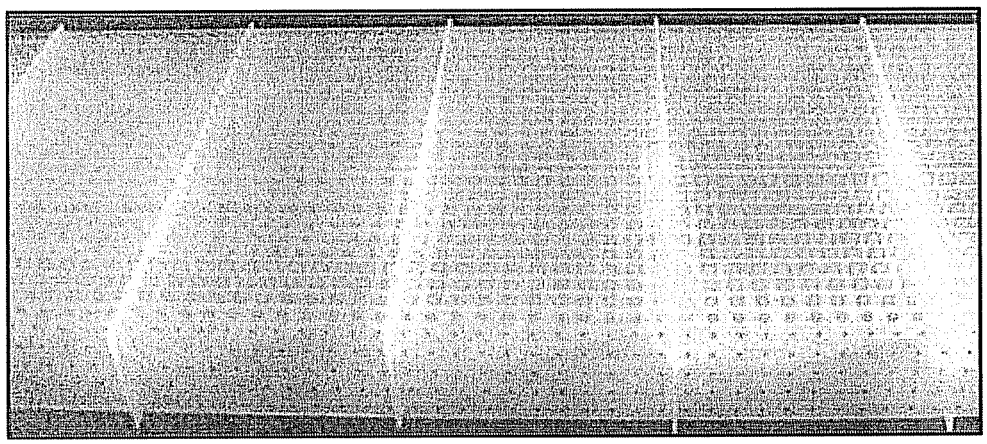
FIG. 4 is a diagram illustrating a fabricated sample in which the metamaterial structures vary with space coordinate according to an embodiment of the subject matter described herein.
Figure 5A:
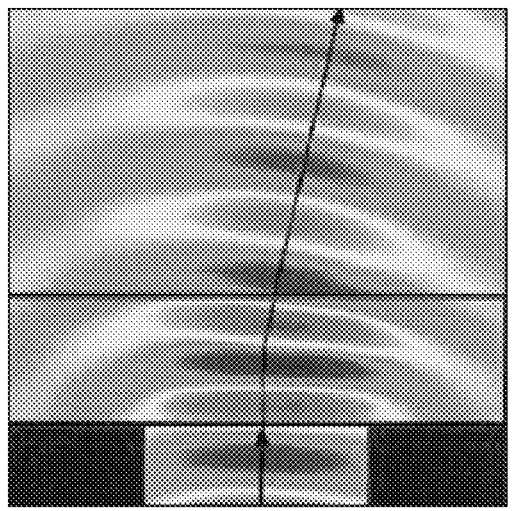
FIGS. 5(a)-5(d) are diagrams illustrating field mapping measurements of the beam steering lens according to an embodiment of the subject matter described herein.
Figure 5B:
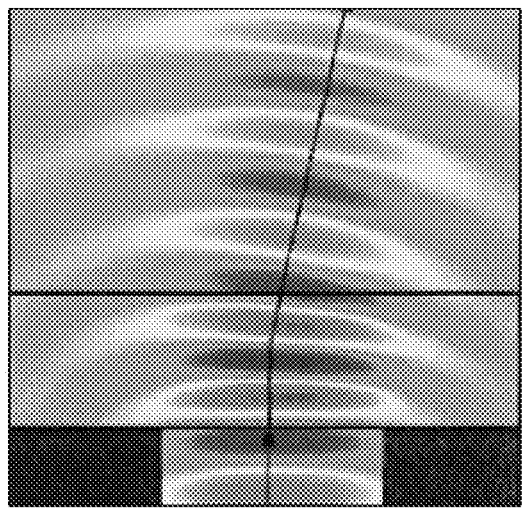
Figure 5C:
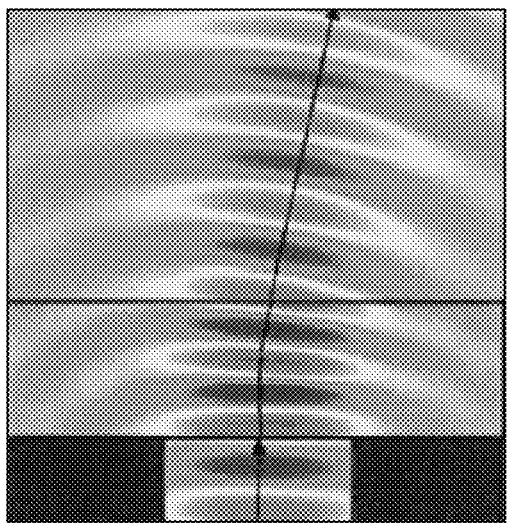
Figure 5D:
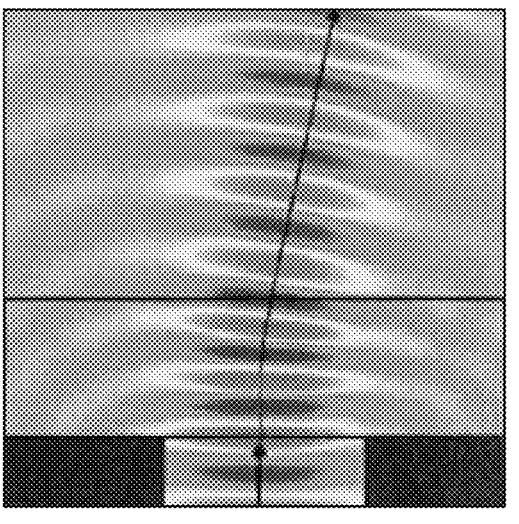
Figure 6A:
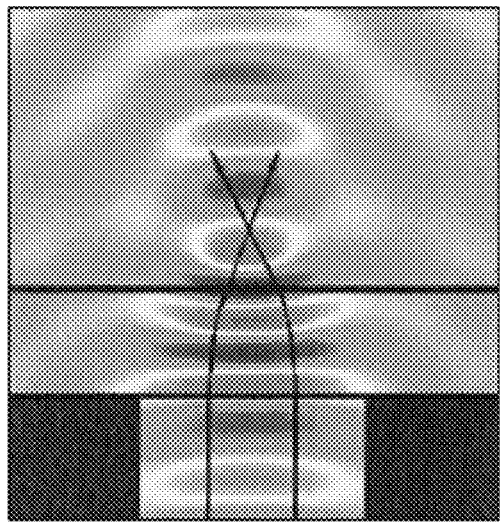
FIGS. 6(a)-6(d) are diagrams illustrating field mapping measurements of a beam focusing lens according to an embodiment of the subject matter described herein.
Figure 6B:
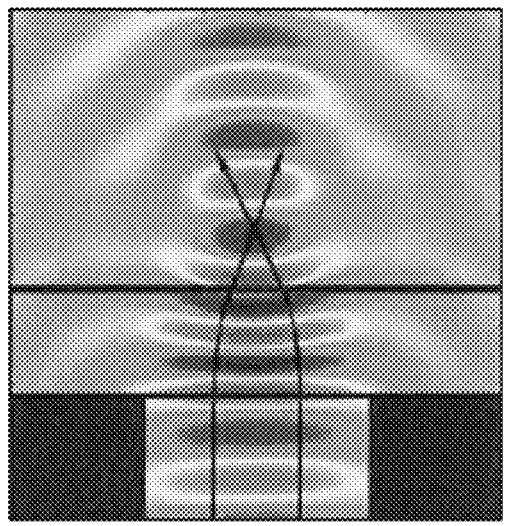
Figure 6C:
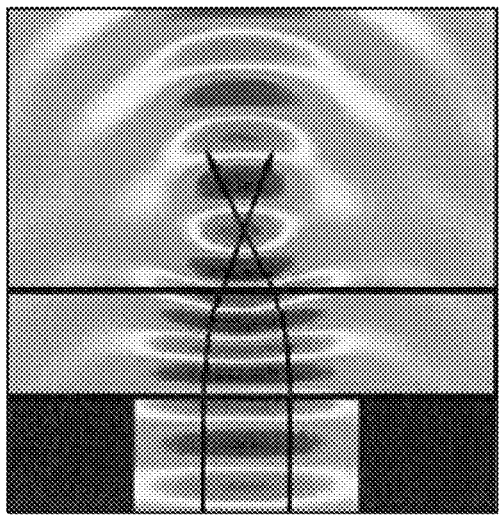
Figure 6D:
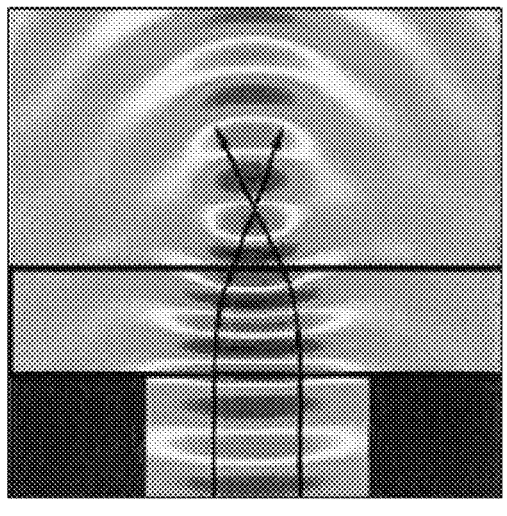

In which, $\in_a=1.9$ is an adjusted dielectric constant for the simulation of a unit cell of FIG. 4 that provides an appropriate fitting parameter that can represent the practical situation of the effect from substrate dielectric constant and the contribution to DC permittivity from high order resonances. Though there is disagreement between the predicted and retrieved values of permittivity, the values are of similar order and show clearly a similar trend: the high frequency resonance properties are strongly correlated to the zero frequency polarizability. By modifying the high-frequency resonance properties of the element, the zero- and low-frequency permittivity can be adjusted to arbitrary values.

TABLE 1

The predicted and actual zero-frequency permittivity values as a function of the until cell dimension. a.

| a | $f_0$ | $f_L$ | $\varepsilon_{predicted}$ | $\varepsilon_{actual}$ |
|---|---|---|---|---|
| 1.70 | 44.0 | 59.0 | 3.416 | 3.425 |
| 1.55 | 54.0 | 64.0 | 2.670 | 2.720 |
| 1.40 | 64.0 | 71.0 | 2.338 | 2.315 |
| 1.20 | 77.4 | 79.2 | 1.989 | 1.885 |

Because the closed ring design shown in FIG. 2 can easily be tuned to provide a range of dielectric values, it is an example of a base element to illustrate more complex gradient-index structures. While the closed ring structure is illustrative, a variety of other structures including I-shaped structures, pluralities of rings, non-rings, and more complex combinations of structures that provide bases of electric and/or magnetic responses, can act as base elements for the defined structures. Moreover, the approaches herein can be applied to combinations of base elements of different types where the respective effects on the effective electric and magnetic parameters are combined.

Though its primary response is electric, the closed ring also possesses a weak, diamagnetic response that is induced when the incident magnetic field lies along the ring axis. The closed ring medium therefore is characterized by a magnetic permeability that differs from unity, and which may be included for a full description of the material properties. The presence of both electric and magnetic dipolar responses is generally useful in designing complex media, having been demonstrated in the metamaterial cloak. By changing the dimensions of the ring, it is possible to control the contribution of the magnetic response.

The permittivity can be accurately controlled by changing the geometry of the closed ring. The electric response of the closed ring structure is identical to the "cutwire" structure previously studied (See, e.g., Smith et. al., "Design of Metamaterials with Negative Refractive Index," Proc. Of SPIE Vol. 5359 (2004), the disclosure of which is incorporated herein by referenced in its entirety) where it has been shown that the plasma and resonance frequencies are simply related to circuit parameters according to $$\omega_p^2 \approx \frac{1}{L} \text{ and } \omega_0^2 \approx \frac{1}{LC}.\quad (6)$$

For this illustrative case of the closed ring, L is the inductance primarily associated with the arms of the closed ring and C is the capacitance primarily associated with the gap between adjacent closed rings. For a fixed unit cell size, the inductance can be varied primarily either by changing the thickness w, of the conducting rings or their length, a. The capacitance can be controlled primarily by changing the overall size of the ring, which correspondingly varies the gap between adjacent closed rings.

Figure 2A:
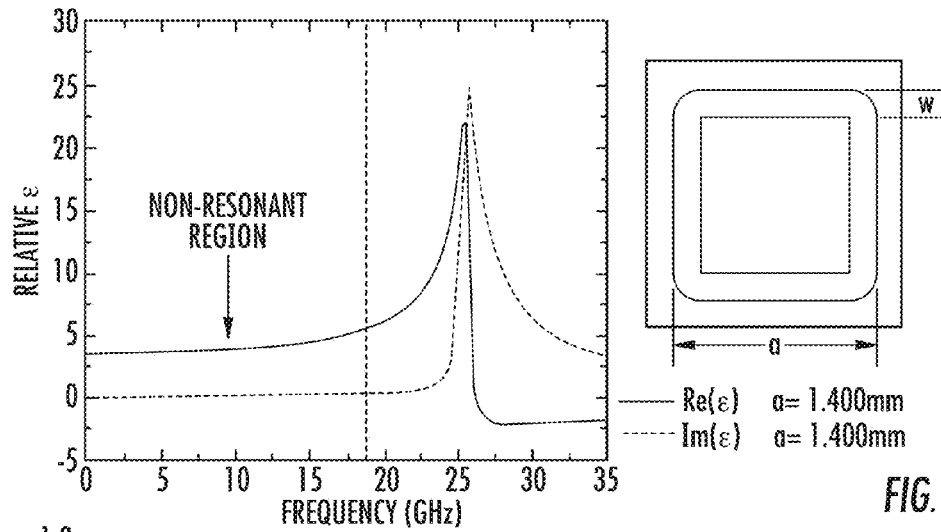
FIGS. 2(a)-2(c) are diagrams illustrating retrieval results for a closed ring medium according to an embodiment of the subject matter described herein. For the closed rings depicted in FIGS. 2(a)-2(c), the radius of curvature of the corners is 0.6 mm, and w=0.2 mm.
Figure 2B:
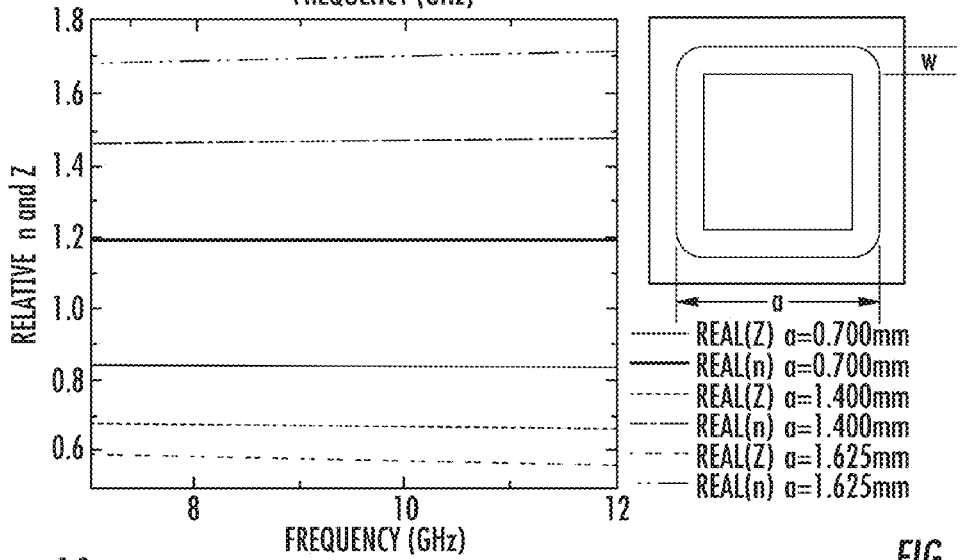
Figure 2C:
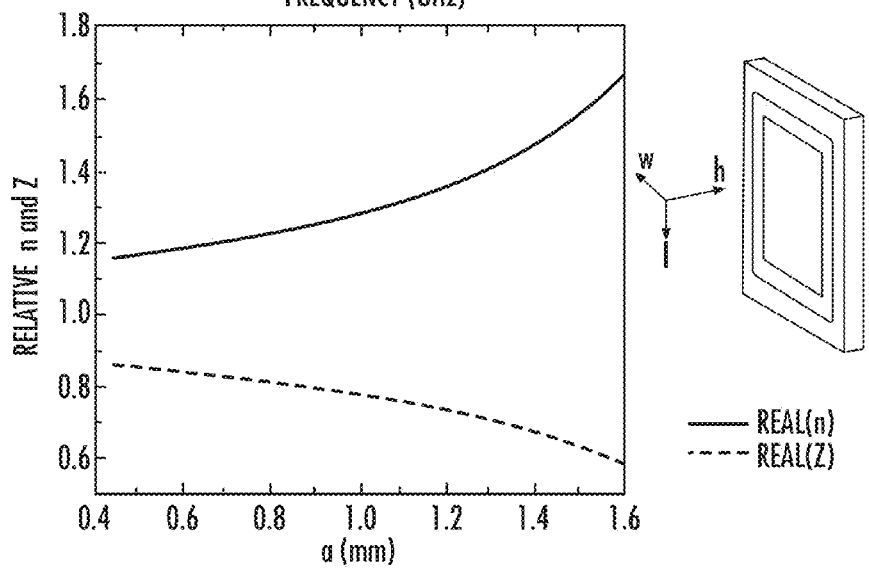

Changing the resonance properties in turn changes the low frequency permittivity value, illustrated by the simulation results presented in FIG. 2. Specifically, FIG. 2(a) shows the extracted permittivity with a=1.4 mm, FIG. 2(b) shows the extracted index and impedance for several values of a. (The low frequency region is shown); and FIG. 2(c) shows the relationship between the dimension a and the extracted refractive index and wave impedance. The closed ring structure shown in FIG. 2(a) is modeled to be deposited on FR4 substrate, whose permittivity is 3.85+i0.02 and thickness is 0.2026 mm. The unit cell dimension is 2 mm, and the thickness of the deposited metal layer (modeled as copper) is 0.018 mm. For this structure, a resonance occurs near 25 GHz with the permittivity nearly constant over a large frequency region (roughly zero to 15 GHz). Simulations of three different unit cell with ring dimensions of a=0.7 mm, 1.4 mm and 1.625 mm were also simulated to illustrate the effect on the material parameters. In FIG. 2(b), it is observed that the index value becomes larger as the ring dimension is increased, the larger polarizability of the larger rings. The refractive index remains, for the most part, relatively flat as a function of frequency for frequencies well below the resonance. The index does exhibit a slight monotonic increase as a function of frequency, however, which is due to the higher frequency resonance. The impedance changes also exhibits some amount of frequency dispersion, due to the effects of spatial dispersion on the permittivity and permeability. The losses in this structure are found to be negligible, as a result of being far away from the resonance frequency. This result emerges despite the fact that the substrate in the model is not one optimized for RF circuits—in fact, the FR4 circuit board substrate modeled here is generally considered quite lossy.

As can be seen from the simulation results in FIG. 2, metamaterial structures based on the closed ring element would be nearly non-dispersive and low-loss, provided the resonances of the elements are sufficiently above the desired range of operating frequencies. As an illustration, the closed ring element was incorporated into two gradient index devices: a beam focusing lens and a beam steering lens. The use of resonant metamaterials to implement positive and negative gradient index structures was described for example in D. R. Smith et al, U.S. patent application Ser. No. 11/658,358 (previously incorporated by reference) and subsequently applied in various contexts. The design approach is first to determine the desired continuous index profile to accomplish the desired function (e.g., focusing with a desired focal length, or steering with a directed angle of deflection) and then to stepwise approximate the index profile using a discrete number of metamaterial elements. The elements can be designed by performing numerical simulations for a large number of variations of the geometrical parameters of the unit cell (i.e., a, w, etc.); once enough simulations have been run so that a reasonable interpolation can be formed of the permittivity as a function of the geometrical parameters, the metamaterial gradient index structure can be laid out and fabricated.

Figure 3:
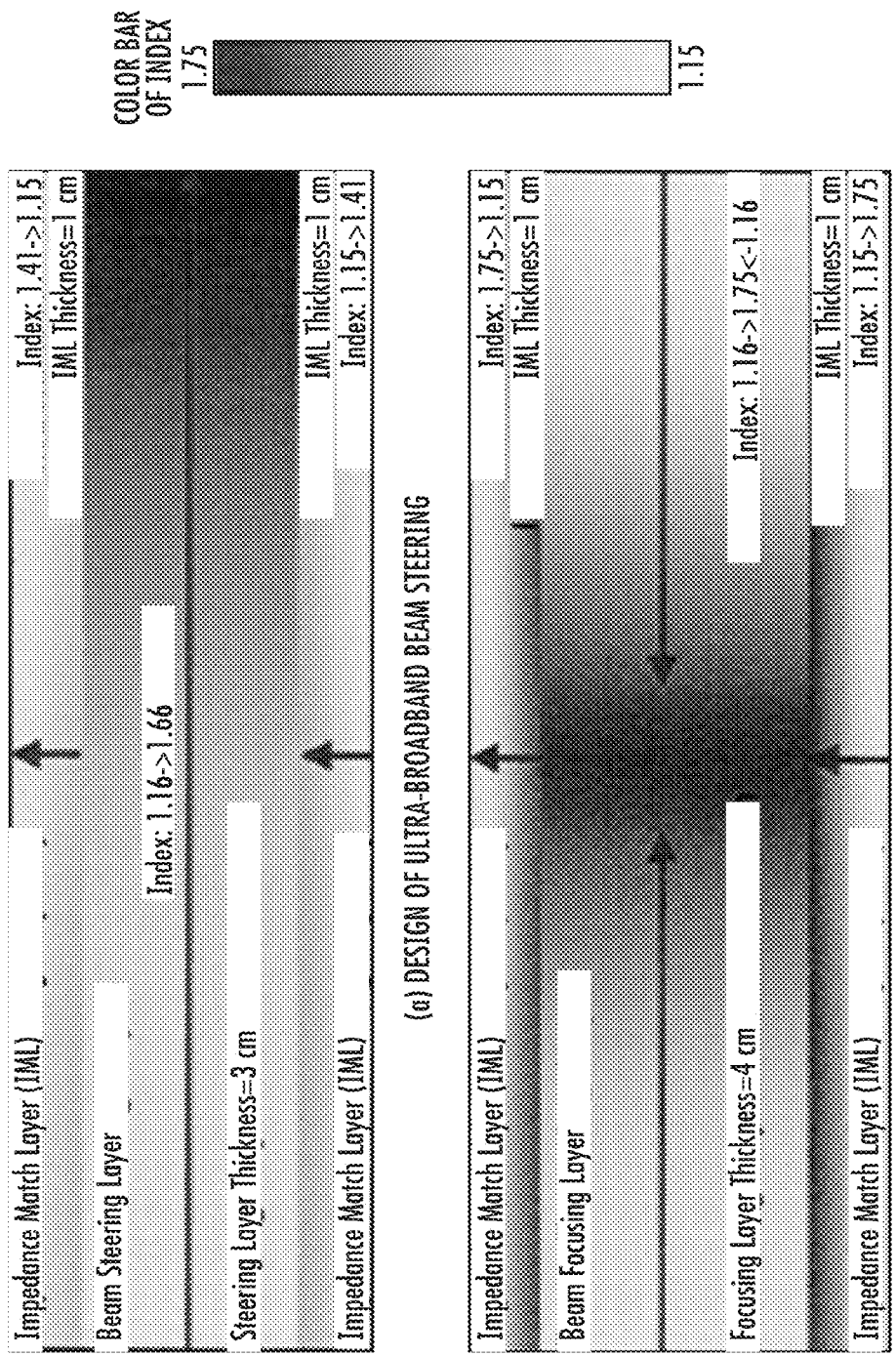
FIG. 3 is a diagram illustrating refractive index distributions for the designed gradient index structures according to embodiments of the subject matter described herein.

Two gradient index samples were designed to test the bandwidth of the non-resonant metamaterials. Specifically, graph (a) of FIG. 3 shows a beam-steering element based on a linear index gradient and graph (b) of FIG. 3 shows a beam focusing lens, based on a higher order polynomial index gradient. Note the presence in both designs of an impedance matching layer (IML), provided to improve the insertion loss by reducing or substantially eliminating reflections at input and output surfaces of the structures. The color maps in FIG. 3 show an exemplary index distribution corresponding to the beam steering layer (graph (a) of FIG. 3 and the beam focusing layer (graph (b) of FIG. 3). Although the gradient index distributions provide the functions of either focusing or steering a beam, there remains a substantial mismatch between the predominantly high index structure and free-space. This mismatch was managed in prior demonstrations by adjusting the properties of each metamaterial element such that the permittivity and permeability were essentially equal. This flexibility in design is an inherent advantage of resonant metamaterials, where the permeability response can be engineered on a nearly equal footing with the electric response. By contrast, that degree of flexibility is not available for designs involving non-resonant elements, gradient index impedance matching layers (IML) are positioned at input and output surfaces of the lens to provide impedance matches from free-space to the lens, as well as a match from the exit of the lens back to free space (in other embodiments an impedance matching layer is matched to an ambient impedance of an ambient medium (non-free-space) that abuts a surface of the lens).

In the exemplary embodiment of graph (a) of FIG. 3, the beam steering layer is a slab with a linear index gradient in the direction transverse to the direction of wave propagation. The index values range from n=1.16 to n=1.66, consistent with the range available from our designed set of closed ring metamaterial elements. To improve the insertion loss and to minimize reflection, the IML is placed on both sides of the sample (input and output). The index values of the IML gradually change from unity (air) to n=1.41, the index value at the center of the beam steering slab. This index value was chosen because most of the energy of the collimated beam passes through the center of the sample. In other embodiments the IML is substantially index-matched to the beam steering layer along a substantial or total transverse extent of the beam steering layer. To implement the actual beam steering sample, we made use of the closed ring unit cell shown in FIGS. 2(a)-2(c) and designed an array of unit cells having the distribution shown in graph (a) of FIG. 3.

The exemplary beam focusing lens is a planar slab with the index distribution as represented in graph (b) of FIG. 3. The index distribution has the functional form of $$Re(n)=4\times 10^{-6}|x|^3-5\times 10^{-4}|x|^2-6\times 10^{-4}|x|+1.75, \quad (3)$$

in which x is the transverse distance away from the center of the lens. More generally, a transverse index profile that is a concave function will provide a positive focusing effect (corresponding to a positive focal length); a transverse index profile that is a convex function will provide a negative focusing effect (corresponding to a negative focal length, e.g. to receive a collimated beam and transmit a diverging beam). Once again, an IML was used to match the sample to free space. In this case, the index profile in the IML was ramped linearly from n=1.1 5 to n=1.75, the latter value selected to match the index at the center of the lens. In other embodiments the IML is substantially index-matched to the beam focusing layer along a substantial or total transverse extent of the beam focusing layer. The same unit cell design was utilized for the exemplary beam focusing lens as for the exemplary beam steering lens.

For approaches wherein the nonresonant element are adjustable nonresonant elements (as discussed below), embodiments may provide an apparatus having an electromagnetic function (e.g. beam steering, beam focusing, cloaking) that is correspondingly adjustable. Thus, for example, a beam steering apparatus may be adjusted to provide at least first and second deflection angles; a beam focusing apparatus may be adjusted to provide at least first and second focal lengths; a cloaking apparatus may be adjusted to provide at least first and second apparent surfaces of reflection different than an actual surface of reflection. To confirm the properties of the gradient index structures, we fabricated the two designed samples using copper clad FR4 printed circuit board substrate, shown in FIG. 4. Following a procedure previously described, sheets of the samples were fabricated by standard optical lithography, then cut into 1 cm tall strips that could be assembled together to form the gradient index slabs. To measure the sample, we placed them into a 2D mapping apparatus, which has been described in previous work (see D. R. Smith et al, Phys. Rev. Lett. 93, 137405 (2004)); and mapped the near field distribution.

FIGS. 5(a)-5(d) show the beam steering of the broadband metamaterial design, in which a large broadband is covered. The actual bandwidth starts from DC and goes up to approximately 14 GHz. Referring to FIGS. 5(a)-5(d), the exemplary lens has a linear gradient that causes the incoming beam to be deflected by an angle of 16.2 degrees. The effect is broadband, as can be seen from the identical maps in FIGS. 5(a)-5(d) taken at four different frequencies that span the X-band range of the experimental apparatus. From FIGS. 5(a)-5(d), it can be seen that beam steering occurs at all the four different frequencies from 7.38 GHz to 11.72 GHz with an identical steering angle of 16.2 degrees. The energy loss through propagation is extremely low and can barely be observed. FIGS. 6(*a*)-6(*d*) shows the mapping result of the beam focusing sample. Broadband property is demonstrated again at four different frequencies with an exact same focal distance of 35 mm and low loss. Referring to FIGS. 6(*a*)-6(*d*), the exemplary lens has a symmetric profile about the center (given by Equation (7)) that causes the incoming beam to be focused to a point. Once again, the function is broadband, as can be seen from the identical maps taken at four different frequencies that span the X-band range of the experimental apparatus.

In summary, the descriptions above propose broadband metamaterials, based on which complex inhomogeneous material can be realized and accurately controlled. The configuration of broadband metamaterials and the design approach are validated by experimental fabrication and testing. Due to its low loss, designable properties and easy access to inhomogeneous material parameters, the broadband metamaterials will find wide applications in the future.

While exemplary embodiments are depicted as spatial arrangements of nonresonant elements having varied geometrical parameters (such as a length, thickness, or unit cell dimension) and correspondingly varied individual electromagnetic responses (e.g. as depicted in FIGS. 2(*b*) and 8(*b*)), in other embodiments other physical parameters of the nonresonant elements are varied (alternatively or additionally to varying the geometrical parameters) to provide the varied individual electromagnetic responses. For example, embodiments may include nonresonant elements (such as split ring resonators) that include capacitive gaps, and the varied physical parameters include varied capacitances of the capacitive gaps. Embodiments may include LC resonators (e.g. having LC resonance frequencies substantially exceeding an operating frequency range), and the varied physical parameters include impedances (R, L, and/or C) of the LC resonators. Other examples of metamaterial elements having varied physical parameters (and correspondingly varied individual electromagnetic responses) are provided in D. R. Smith et al, U.S. patent application Ser. No. 11/658,358, previously incorporated by reference. Moreover, while exemplary embodiments herein may employ a regression analysis relating electromagnetic responses to geometrical parameters (cf. the regression curve in FIG. 8(*b*)), more generally, embodiments may employ a regression analysis relating electromagnetic responses to any or all physical parameters that substantially correlates with the electromagnetic responses.

In some embodiments the nonresonant elements are adjustable nonresonant elements, having adjustable physical parameters corresponding to adjustable individual electromagnetic responses of the nonresonant elements. For example, embodiments may include nonresonant elements (such as split ring resonator) that incorporate capacitive gaps with adjustable capacitances (e.g. having a varactor positioned in the gap). Embodiments may include LC resonators having adjustable impedances (e.g. by incorporating active devices such as varactors, PIN diodes, transistors, etc.). Other examples of metamaterial elements having adjustable physical parameters (and correspondingly adjustable individual electromagnetic responses) are provided in D. R. Smith et al, U.S. patent application Ser. No. 11/658,358, previously incorporated by reference. Moreover, while exemplary embodiments herein may employ a regression analysis relating electromagnetic responses to geometrical parameters (cf. the regression curve in FIG. 8(*b*)), embodiments with adjustable nonresonant elements may employ a regression analysis relating electromagnetic responses to adjustable physical parameters that substantially correlate with the electromagnetic responses.

In some embodiments with adjustable nonresonant elements having adjustable physical parameters, the adjustable physical parameters may be adjustable in response to one or more external inputs, such as voltage inputs (e.g. bias voltages for active elements), current inputs (e.g. direct injection of charge carriers into active elements), or optical inputs (e.g. illumination of a photoactive material). Accordingly, some embodiments provide methods that include determining respective values of adjustable physical parameters (e.g. by a regression analysis), then providing one or more control inputs corresponding to the determined respective values. Other embodiments provide adaptive or adjustable systems that incorporate a control unit having circuitry configured to determine respective values of adjustable physical parameters (e.g. by a regression analysis) and/or provide one or more control inputs corresponding to determined respective values.

While some embodiments employ a regression analysis relating electromagnetic responses to physical parameters (including adjustable physical parameters), for embodiments wherein the respective adjustable physical parameters are determined by one or more control inputs, a regression analysis may directly relate the electromagnetic responses to the control inputs. For example, where the adjustable physical parameter is an adjustable capacitance of a varactor diode as determined from an applied bias voltage, a regression analysis may relate electromagnetic responses to the adjustable capacitance, or a regression analysis may relate electromagnetic responses to the applied bias voltage.

While exemplary embodiments describe a broadband metamaterial including nonresonant elements having resonance frequencies well above an operating frequency band, embodiments more generally provide a broadband metamaterial with an operating frequency band substantially different than the resonance frequencies, including embodiments where an operating frequency band is substantially greater than the resonance frequencies, or substantially greater than some, and substantially less than others, of the resonance frequencies. A resonance such as that depicted in graph (c) of FIG. 1 may be characterized by large dispersion for frequencies within a characteristic bandwidth of the resonance, and little or no dispersion for frequencies well above or well below the characteristic bandwidth of the resonance. Accordingly, some embodiments may provide a broadband metamaterial having an operating frequency band that does not overlap the union of the characteristic bandwidths for the plurality of nonresonant elements that at least partially compose the broadband metamaterial, where the union of the characteristic bandwidths may be situated above, below, or partially both above and below, the operating frequency band.

Embodiments of a broadband metamaterial provide a ground-plane cloak. A specification of an exemplary ground-plane cloak can be determined at least in part using methods such as those described in Li and Pendry, Phys. Rev. Lett. 101, 203901 (2008), which is herein incorporated by reference. For example, in a scenario where waves are restricted to a single plane of incidence, with the polarization of the waves being transverse electric (electric field perpendicular to the plane of incidence or parallel to the ground plane), then the cloak parameters need only be determined across a two-dimensional (2D) plane. The domain of this exemplary scenario is thus a 2D space, filled with a uniform dielectric with refractive index value $n_b$ and bounded by a conducting sheet. For the exemplary ground plane cloak, consider a family of coordinate transformations that map a nonplanar surface to planar surface; however, other embodiments correspond to a coordinate transformation that maps a nonplanar surface to another nonplanar surface, or a planar surface to a nonplanar surface. Coordinate transformations that map a first surface to a second surface generally lead to an anisotropic medium with values of $n_x$ and $n_y$ that vary as a function of spatial coordinates. Defining an anisotropy factor as $\alpha=\max(n_x/n_y, n_y/n_x)$, transformations can be found for which $\alpha$ is near unity so that a substantially isotropic refractive index value is defined that varies throughout the space. If $n_b$ in the original space is sufficiently greater than unity, then the values for the refractive index of the cloaking structure are also greater than unity. Under these conditions, nonresonant metamaterial elements can be used, and the cloak can exhibit a broad frequency bandwidth.

According to one embodiment described herein, we applied an optimization technique as described in Li and Pendry (as cited above) for the transformation region, in which a quasi-conformal coordinate map is generated by minimizing the Modified-Liao functional with slipping boundary conditions. The Jacobian matrix $\Lambda$ that relates the physical and virtual systems is then computed numerically, from which the index distribution $n^2 = 1\sqrt{\Lambda^T\Lambda}$ of the cloak is found (here, T is the transpose of the Jacobian matrix). In one exemplary design, $\alpha=1.04$, which may be regarded as negligible (that is, for purposes of modeling the exemplary embodiment, we assume $n_x=n_y$).

Figure 7A:
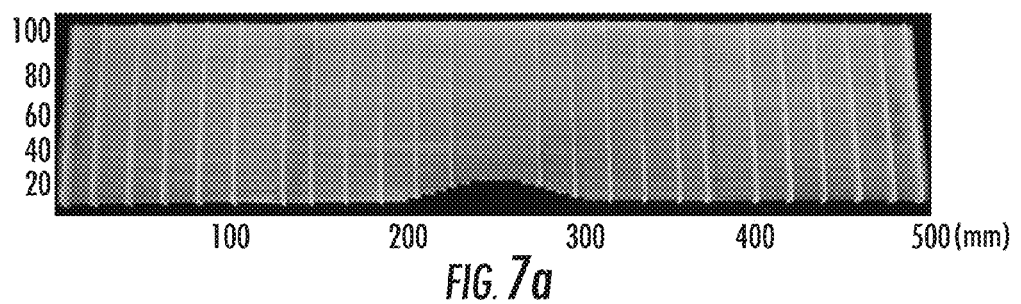
FIGS. 7(a)-7(d) are diagrams showing an exemplary transformation optical design for a ground-plane cloak according to an embodiment of the subject matter described herein. The metamaterial cloak region is embedded in a uniform higher index background with gradients introduced at the edges to form impedance matching regions.
Figure 7B:
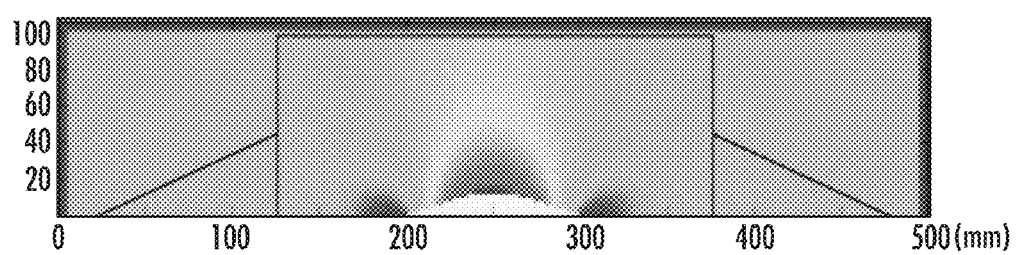
Figure 7C:
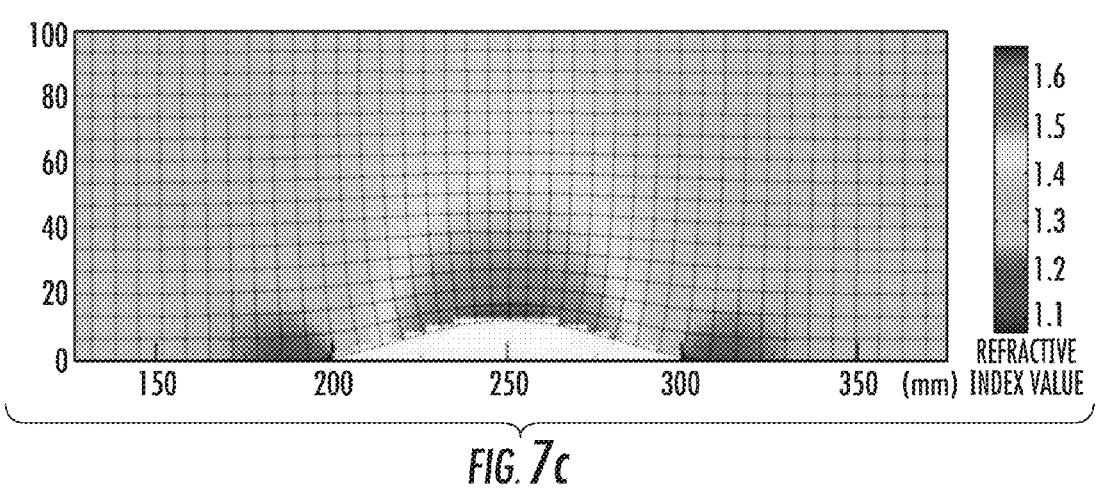
Figure 7D:
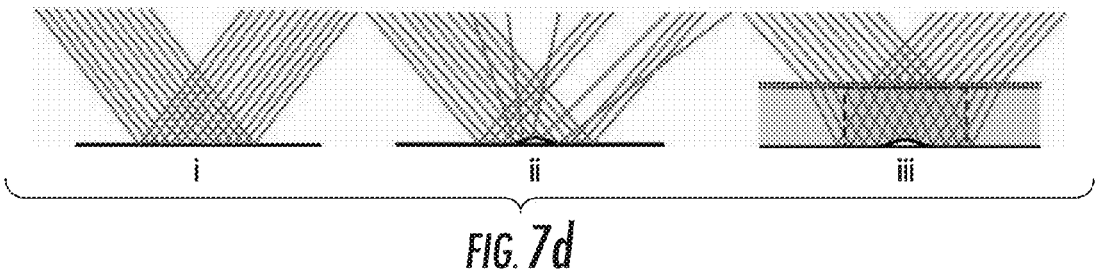

A photograph of the fabricated sample, a color map indicating the transformed space, and the associated refractive index distribution are presented in FIGS. 7(a)-7(d). In FIGS. 7(a)-7(d), the metamaterial cloak region is embedded in a uniform higher index background with gradients introduced at the edges to form impedance matching regions (IMLs). Specifically, FIG. 7(a) shows a photograph of the fabricated metamaterial sample; FIG. 7(b) shows a metamaterial refractive index distribution (The coordinate transformation region is shown within the box outlined in black. The surrounding material is the higher index embedding region and the IMLs.); FIG. 7(c) shows an expanded view of the transformation optical region in which the mesh lines indicate the quasi-conformal mapping (lateral dimensions of the unit cells are ~3.5 times smaller in this instance); FIG. 7(d) shows ray tracing of a beam incidents illuminating on (i) the ground, (ii) the perturbation, and (iii) the perturbation covered by a ground-plane cloak, where the gray area and dashed lines in (iii) indicate the transformation region, embedded background material, and IML. In this example, the entire cloak is embedded in a background material with refractive index $n_b=1.331$, and the transformation leads to refractive index values for the ground-plane cloak that range from D=1.08 to 1.67 (values that can be achieved with the use of nonresonant metamaterial elements). On the right and left side of the sample in FIG. 7(b), the refractive index distribution is uniform ($n_b=1.331$), taking the value of the background material. Because the cloak is designed to be embedded in a higher dielectric region, we add an impedance matching layer (IML) that surrounds the entire structure, for which the index changes gradually (and, in this instance, linearly) from that of air to that of the background index. This step is taken to minimize reflection from the cloak surface when illuminated by a microwave beam within the scattering chamber, which exists in an n=1.0 (air) environment. Because of the index gradient coupled with the cloak, we expect no amplitude scattering and only a slight offset of the wave reflected from the ground-plane structure due to the refractive index change. The effect should be similar to observing a mirror through a layer of glass; objects on the top of the mirror, within the cloaked region, remain hidden from detection (visualized by ray tracing in FIG. 7(d)). It is important to note that this type of cloaking phenomena is distinct from current scattering suppression technologies because it both eliminates backscattering and restores the reflected beam.

To implement the illustrative cloak defined by the index distribution presented in FIG. 7(c) and the associated background material and IML in FIG. 7(b), the continuous theoretical constitutive parameter distribution can be approximated by a discrete number of metamaterial elements. In our design, the entire sample region is divided into 2-by-2-mm squares, requiring more than 10,000 elements, about 6,000 of which are unique.

Figure 8A:
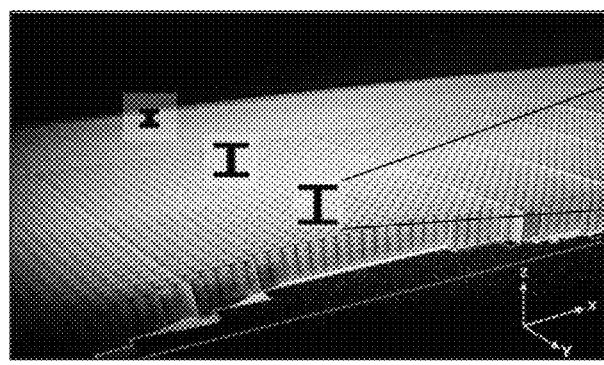
FIGS. 8(a) and 8(b) are diagrams showing an exemplary design of nonresonant elements and the relation between the unit cell geometry and the effective index according to an embodiment of the subject matter described herein.
Figure 8B:
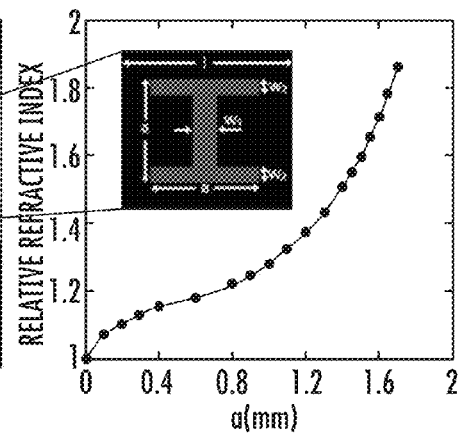

The elements chosen to achieve the design are all variations of the I-shaped structures shown in FIGS. 8(a)-8(b). Referring to FIGS. 8(a)-8(b), the dimensions of the metamaterial unit cells are l=2 mm, $w_1=0.3$ mm, $w_2=0.2$ mm, and a varying from 0 to 1.7 mm. By changing the dimension a, we are able to span the required index range of n=1.08 to 1.67 (as shown by the curve in FIG. 8(b)). After a well-established retrieval process, modified to include the effects of the finite unit cell size relative to the wavelength, the effective permittivity and permeability for a given element can be found via numerical simulation. A regression curve (such as the solid curve fitting the points in FIG. 8(b)) can then be made that relates the refractive index associated with a given element to the length G. Once a set of elements has been numerically simulated, all subsequent tasks in the cloak design—from the generation of the regression curve to the final layout of the elements in a mask for lithographic processing—are performed according to known techniques (e.g. using a single Matlab program). The metamaterial elements we employ in this example actually exhibit some degree of frequency dispersion in their constitutive parameters caused by their finite dimension with respect to the wavelength, as further discussed below. In particular, the in-plane permeability and out-of-plane permittivity vary as a function of frequency such that the index stays approximately constant but the wave impedance varies considerably. Because the cell-to-cell change in impedance is minor, there is no reflection and no discernable disturbance in the cloak properties over the entire frequency range measured. As with previous metamaterial designs implemented for microwave experiments, the exemplary ground-plane cloak is fabricated on copper-clad printed circuit board with FR4 substrate (the substrate thickness is 0.2026 mm, with a dielectric constant of 3.85+i0.02). The completed sample is 500 by 106 mm with a height of 10 mm. The center region, 250 by 96 mm, corresponds to the transformed cloaking region, whereas the rest of the sample is used for dielectric embedding and impedance matching. The cloak transformation is specifically designed to compensate, in this instance, a perturbation introduced on the conducting surface that follows the curve $y=12\cos^2[(x-125)\pi/125]$ (units in millimeters).

To verify the predicted behavior of the illustrative ground-plane cloak design, we make use of a phase-sensitive, near-field microwave scanning system to map the electric field distribution inside a planar waveguide. The planar waveguide restricts the wave polarization to transverse electric. The details of the apparatus have been described previously in B. J. Justice et al, Opt. Express 14, 8694

Figure 9:
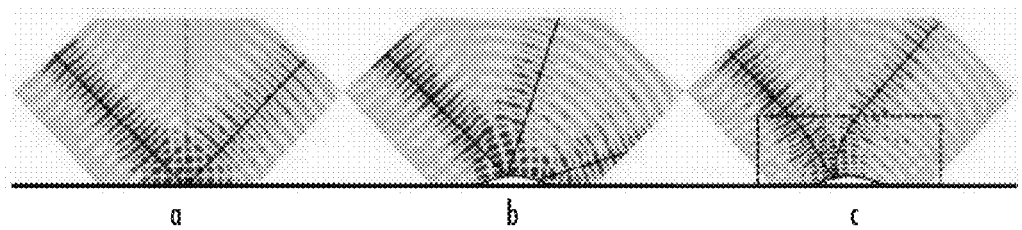
FIG. 9 is a diagram showing a measured field mapping (E-field) of a ground, perturbation, and ground-plane cloaked perturbation. The rays display the wave propagation direction, and the dashed line indicates the normal of the ground in the case of free space and that of the ground-plane cloak in the case of the transformed space.
Figure 9:
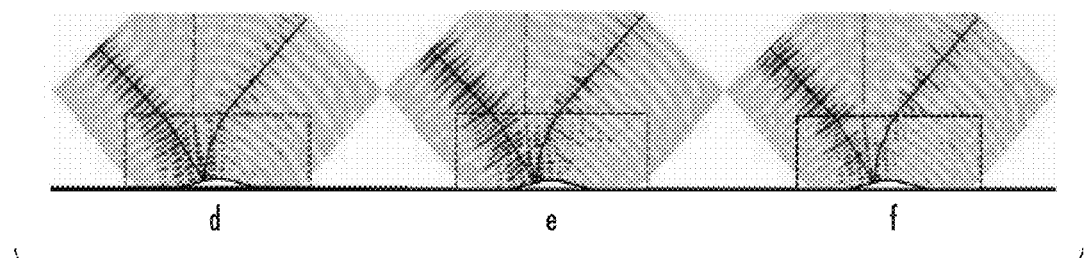

(2006). A large area field map of the scattering region, including the collimated incident and scattered beams, is shown in graphs (a)-(f) of FIG. 9. The waves are launched into the chamber from a standard X-band coax-to-waveguide coupler and pass through a dielectric lens that produces a nearly collimated microwave beam. The beam is arbitrarily chosen to be incident on the ground plane at an angle of 40° with respect to the normal. Graphs (a)-(f) of FIG. 9 show a measured field mapping (E-field) of the ground, perturbation, and ground-plane cloaked perturbation. The rays display the wave propagation direction, and the dashed line indicates the normal of the ground in the case of free space and that of the ground-plane cloak in the case of the transformed space. Specifically, graph (a) of FIG. 9 shows a collimated beam incident on the ground plane at 14 GHz; graph (b) of FIG. 9 shows collimated a beam incident on the perturbation at 14 GHz (control); graph (c) of FIG. 9 shows collimated beam incident on the ground plane cloaked perturbation at 14 GHz; graph (d) of FIG. 9 shows a collimated beam incident on the ground-plane cloaked perturbation at 13 GHz; graph (e) of FIG. 9 shows a collimated beam incident on the ground-plane cloaked perturbation at 15 GHz; and graph (f) of FIG. 9 shows a collimated beam incident on the ground-plane cloaked perturbation at 16 GHz. A flat ground plane produces a near perfect reflection of the incident beam in graph (a) of FIG. 9, whereas the presence of the perturbation produces considerable scattering, as shown in graph (b) of FIG. 9 (note the presence of the strongly scattered secondary beam). By covering the space surrounding the perturbation with the metamaterial cloaking structure, however, the reflected beam is restored, as if the ground plane were flat in graph (c) of FIG. 9. The beam is slightly bent as it enters the cloaking region because of the refractive index change of the embedding material but is bent back upon exiting. The gradient-index IML introduced into the design minimizes reflections at the boundaries of the cloaking region.

As the exemplary ground-plane cloak makes use of non-resonant elements, it is expected to exhibit a large frequency range of operation. The cloaking behavior was confirmed in our measurements from the range 13 to 16 GHz, though we expect the bandwidth to actually stretch to very low frequencies (<1 GHz) that cannot be verified experimentally because of limitations of the measurement apparatus and the beam-forming lens. We illustrate the broad bandwidth of the cloak with the field maps taken at 13 GHz in graph (d) of FIG. 9, 15 GHz in graph (e) of FIG. 9, and 16 GHz in graph (f) of FIG. 9, which show similar cloaking behavior to the map taken at 14 GHz in graph (c) of FIG. 9. The collimated beam at 16 GHz has begun to deteriorate because of multi-mode propagation in our 2D measurement chamber, which is also observed in the flat ground-plane control experiment at that frequency. The predicted response of the broadband unit cells extends to up to ~18 GHz.

Figure 10:
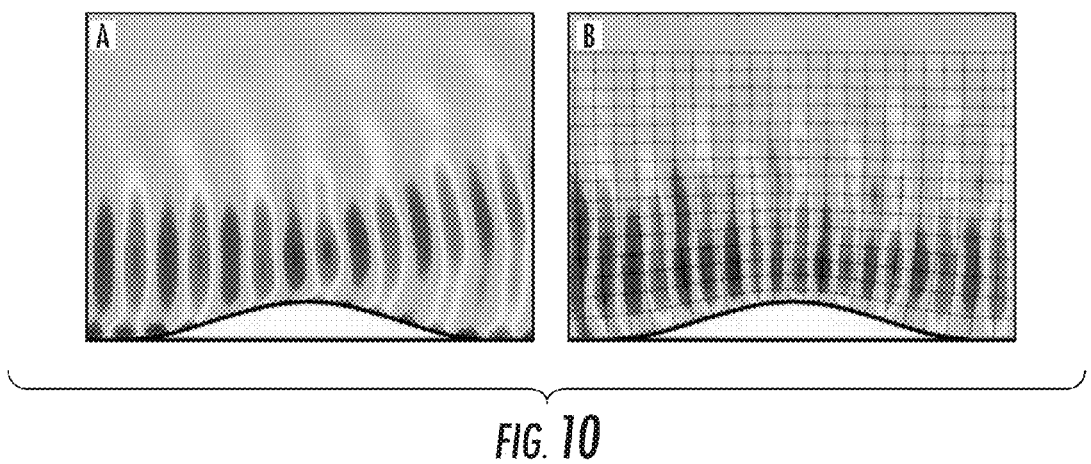
FIG. 10 is a diagram showing a 2D field mapping (E-field) of the perturbation and ground-plane cloaked perturbation, illuminated by the waves from the left side (A) perturbation and (B) ground-plane cloaked perturbation. The grid pattern indicates the quasi-conformal mapping of the transformation optics material parameters.

To further visualize the performance of the exemplary ground-plane cloak, we illuminated the sample from the side (90° from the surface normal) with a narrow collimated beam. As the ground-plane cloaked perturbation should also be cloaked with the respect to an observer located on the ground, the wave, which should follow the metric as defined by the transformation map in FIG. 7(c), can be expected to detour around the perturbation and then return back to its original propagation direction. Specifically, graph (a) of FIG. 10 shows exemplary perturbation without the ground-plane cloak, and graph (b) of FIG. 10 shows the perturbation with the ground plane cloak. The grid pattern indicates the quasi-conformal mapping of the transformation optics material parameters. The field map for this case is shown in graph (b) of FIG. 10, which corresponds with the predicted transformation extremely well (a low-resolution representation of the transformation grid is overlaid on the experimental data). For comparison, graph (a) of FIG. 10 shows a map of the field strongly scattered from the perturbation in the absence of the cloak.

The agreement between the measured field patterns for the exemplary ground-plane cloak and the theory provides convincing evidence that metamaterials can indeed be used to construct such complex electromagnetic media. The broadband and low-loss properties of the exemplary ground-plane cloak would scale to visible frequencies. By merging the nascent technique of transformation optics with traditional gradient-index optics, we have shown that more functional hybrid structures can be developed that enable us to access previously unseen electromagnetic behavior while mitigating some of the inherent limitations. Though transformation optical designs are highly complex, metamaterial implementations can be rapidly and efficiently achieved using the algorithms and approach described herein.

1. Measurement Apparatus

The experimental apparatus for the exemplary ground-plane cloak measurement included two metal plates separated by 1 cm, which form a 2 dimensional planar waveguide region. Microwave measurements were made by a Vector Network Analyzer and the planar waveguide fields were launched by an X-band waveguide coupler towards a polycarbonate collimating lens, which created the narrow beam seen in the measurements. This beam was reflected off of the ground plane at an angle of about 40 degrees from the surface normal. Scanning the top plate (with detector antenna) relative to the bottom plate (and sample) with 181×181 1 mm steps, created a field map of the microwave beam incident on the ground-plane cloak. Due to the large area involved in characterizing the full incident and reflected beams, at each plate step we simultaneously measured the electric field from 4 distinct antenna positions using the switch. These 4 scan areas were then patched together into one large field map using Matlab code to match up the phase and amplitude at the boundaries of each probe region. Comparing the reflection from the ground plane, the ground plane with the perturbation and the ground plane with the cloaked perturbation, demonstrates the cloaking effect. Broadband performance of the exemplary embodiment was confirmed from mapping the field incident upon the cloak for 13-16 GHz for this certain experiment. While we expect that the exemplary cloak would work for much lower and higher frequencies, verification by clean measurements was limited by constraints of the available experimental apparatus. The beam, formed by the finite width polycarbonate lens and used to illuminate the ground plane was distorted by diffraction for frequencies <13 GHz and, at the other end of the spectrum, propagating fields become multimode within the planar waveguide for frequencies >16 GHz.

2. Field Plot Details

Figure 11:
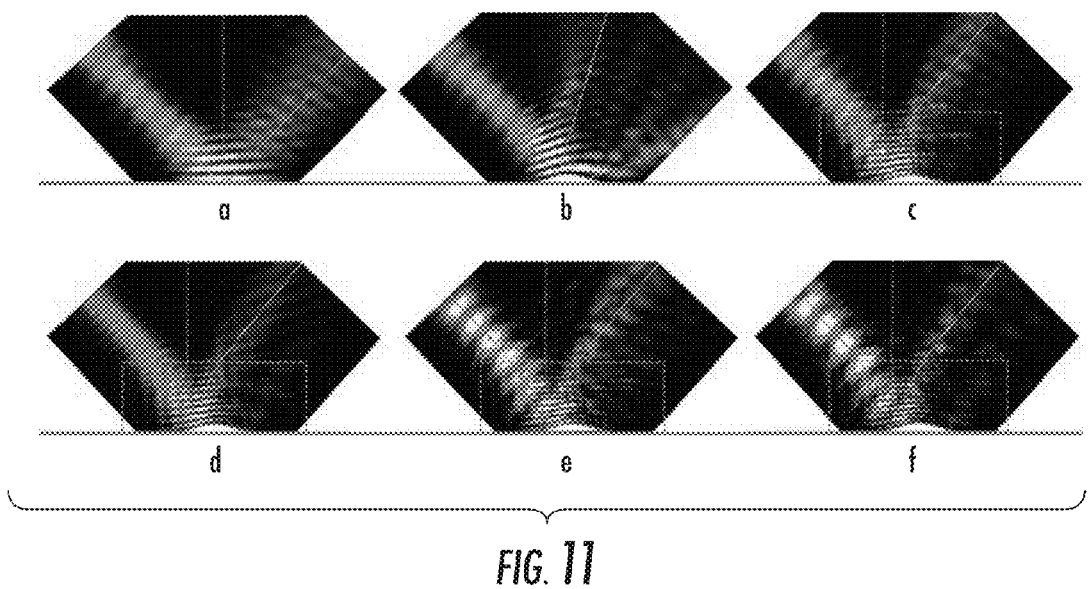
FIG. 11 is a diagram showing a measured field magnitude (E-field) of the ground, perturbation and ground-plane cloaked perturbation according to an embodiment of the subject matter described herein.

Graphs (a)-(f) of FIG. 11 illustrate the measured field magnitude (E-field) of the ground, perturbation and ground-plane cloaked perturbation for the exemplary embodiment. The rays display the wave propagation direction and the dash line indicates the normal of the ground in the case of free space and that of the ground-plane cloak in the case of the transformed space. Graph (a) of FIG. 11 shows a collimated beam incident on the ground plane at 14 GHz, graph (b) of FIG. 11 shows a collimated beam incident on the perturbation at 14 GHz (control), graph (c) of FIG. 11 shows a collimated beam incident on the ground-plane cloaked perturbation at 14 GHz, graph (d) of FIG. 11 shows a collimated beam incident on the ground-plane cloaked perturbation at 13 GHz, graph (e) of FIG. 11 shows a collimated beam incident on the ground-plane cloaked perturbation at 15 GHz, graph (f) of FIG. 11 shows a collimated beam incident on the ground-plane cloaked perturbation at 16 GHz.

Graphs (a)-(f) of FIG. 11 show the measured field magnitude with and without ground-plane cloak. The data sets indicate the power flow in the sample (field magnitude squared is proportional to the power), providing the evidence of the cloaking functionality. The reflected beam for the ground plane is reduced somewhat from the incident beam for all of the scans, due to the non-ideal experimental condition at the conductive boundary and diffraction of the collimated beam. Note that the field magnitude measurement at 15 GHz in graph (e) of FIG. 11 and at 16 GHz graph (f) of FIG. 11 has a standing wave pattern for incoming and outgoing waves due to excitation of higher order modes that occurs at high frequencies in our near-field scanning apparatus; that is, the propagating wave is no longer confined to be Transverse Electric but also has a Transverse Magnetic component.

Figure 12:
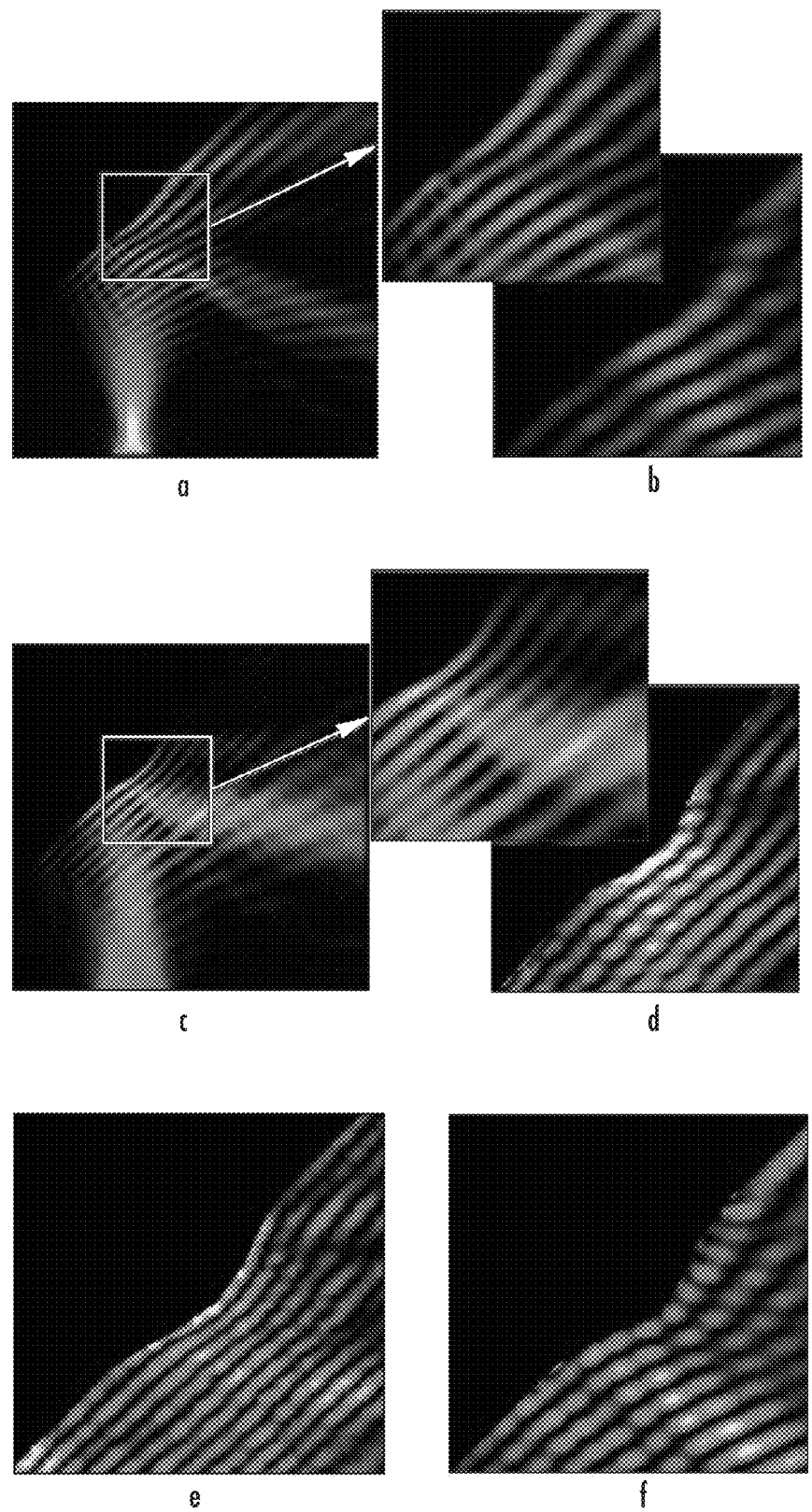
FIG. 12 is a diagram showing a simulation and experiment comparison of field magnitude plot from the perturbation with and without the ground-plane cloak according to an embodiment of the subject matter described herein.
Figure 13A:
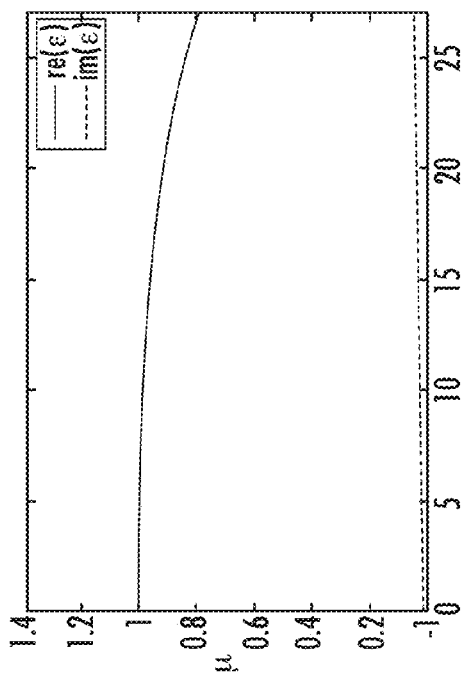
FIGS. 13(a)-13(d) are diagrams showing an effective permittivity, permeability, impedance and refractive index of I-Shape unit-cell with the dimension a=1.4 mm according to an embodiment of the subject matter described herein.
Figure 13B:
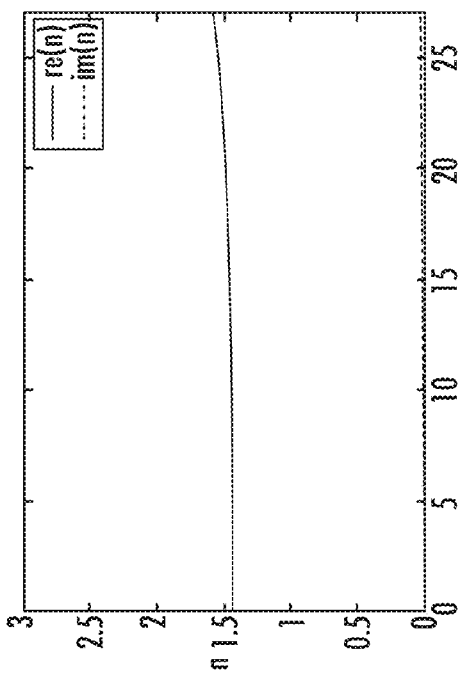
Figure 13C:
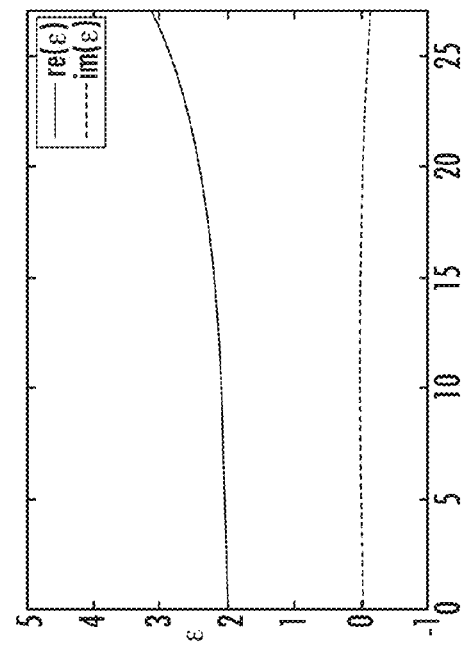
Figure 13D:
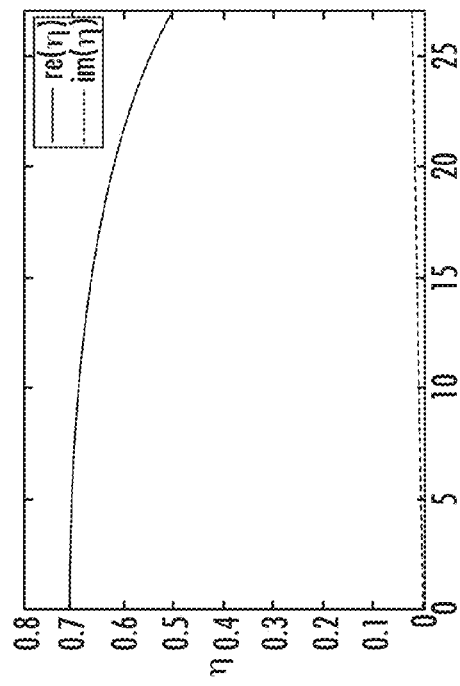

To demonstrate the mechanism of the illustrative cloak in greater detail, the mapped regions within the transformed area are magnified and compared with numerical simulations in graphs (a)-(f) of FIG. 12. These experiments were conducted without the collimating lens, so that a wide beam was incident on the ground plane. The incident and reflected waves produce a characteristic interference pattern that can be used to quantify the agreement between simulation and measurements. When the ground plane is flat, a plot of the magnitude of the total field reveals a series of light and dark interference fringes parallel with the plane. In the absence of the cloak, the perturbation introduces significant distortion into the standing wave pattern; in particular, the interference pattern is no longer parallel to the plane and the reflected beam is split into two out-going beams, as can also be seen clearly in graph (a) of FIG. 12. However, when the exemplary ground-plane cloak is present, the distortion of the standing wave pattern caused by the perturbation is effectively removed. The corresponding interference pattern exhibits lines that appear to flow around the perturbation, as shown in graph (c) of FIG. 12 and graph (d) of FIG. 12, effectively parallel to the plane away from the transformed regions.

FIG. 12 shows a simulation and experiment comparison of field magnitude plot from the perturbation with and without the exemplary ground-plane cloak. Graph (a) of FIG. 12 shows a simulated field magnitude plot of the perturbation at 10 GHz, graph (b) of FIG. 12 shows a comparison of field magnitude between simulation and measurement for the perturbation, graph (c) of FIG. 12 shows a simulated field magnitude plot of ground-plane cloaked perturbation at 10 GHz, graph (d) of FIG. 12 shows a comparison of field magnitude between simulation and measurement for the ground-plane cloaked perturbation, graph (e) of FIG. 12 shows a measured field magnitude of the ground-plane cloaked perturbation at 14 GHz, graph (f) of FIG. 12 shows a measured field magnitude of the perturbation scattering at 14 GHz.

3. Automated Metamaterial Design

FIGS. 13(a)-(d) shows an effective permittivity, permeability, impedance and refractive index of an I-Shape unit-cell (such as that depicted in FIG. 8(b)) with the dimension a=1.4 mm.

To address the numerical burden associated with the design of such a large-scale metamaterial structure, we have automated several aspects of the design process, enabling us to produce thousands of unique metamaterial elements rapidly that are consistent with the optimized transformation optical map. We define as system level the overall spatially varying constitutive parameters which may in some instances be defined by a transformation optical procedure, and define as particle level the design of the constituent elements that form the metamaterial implementation. For embodiments that use transformation optical approaches, a system level design process may include numerical computation of a transformation optical mapping. In a cloaking application, the arbitrary shape of the cloaked perturbation may be modeled by a free curve regression. The system level design process determines the relationship at every spatial point (or a sufficient set of spatial locations) between the original space and the transformed space, e.g. by using a quasi-conformal mapping algorithm. Once the mapping has been determined numerically, transformation optics formulae relating the constitutive parameters to the mapping can then be used to calculate the permittivity and permeability tensors, in which numerical derivatives may provide the Jacobian matrix elements. In a transformation optical approach, the system level design provides the spatial distribution of the constitutive parameters.

Subsequent to a selecting of a spatial distribution of constitutive parameters, a particle-level design method may provide physical dimensions and structure for each unit cell corresponding to the selected spatial distribution of constitutive parameters. We note that Li and Pendry (J. Li, J. B. Pendry, *Phys. Rev. Lett.* 101, 203901 (2008)) suggested a transformation optical (system level) design in which the permeability should remain unity everywhere and only the permittivity vary. Such a transformation would imply the particle level design should be relatively straightforward, since only electric response would be necessary to control. However, metamaterial structures, even those based on non-resonant elements, may exhibit spatial dispersion (i.e., constitutive parameters that depend on the direction of wave propagation) due to the finite size of the unit cell relative to the wavelength. The impact of spatial dispersion is to introduce frequency dispersion into the constitutive parameters, which leads to a frequency dependent magnetic response in addition to that of the frequency dependent electric response, as shown in FIGS. 13(a)-(d). Thus, some approaches consider the spatial dispersion associated with each unit cell as part of the particle level design process. For example, finite unit cell effects may be incorporated into the design procedure using a quasi-analytical method such as that described in R. Liu et al, Phys. Rev. E 76, 026606 (2007), which is herein incorporated by reference. The complete response of the metamaterial element, including the effects of spatial dispersion, may then be mathematically modeled by linear or nonlinear regression.

Once we choose one or several physical dimensions (or other physical parameters) of the unit-cell as variables for a given unit cell topology, we can then build a mathematical model to express the dispersive constitutive parameters via sampling a small set of unit-cell structures whose properties are computed by full wave simulations. Once the library of a certain type of structure is built, a rapid searching algorithm, such as a sequential Monte Carlo approach, can be applied to determine the appropriate physical dimension (or other parameter) of the structure that achieves selected constitutive relations (or selected refractive index and impedance). In our design of the exemplary ground plane cloak and in other embodiments, the refractive index remains approximately constant with frequency but the impedance may vary as a function of frequency for different unit cell designs (i.e. the refractive index is substantially nondispersive over a broadband frequency, although the permittivity and the permeability both exhibit some dispersion over the broadband frequency range, as seen for example in FIGS. 13(a)-(d)). Alternatively or additionally, embodiments may include unit cells for which the wave impedance is substantially nondispersive over a broadband frequency range, although the permittivity and the permeability both exhibit some dispersion over the broadband frequency range. In the exemplary cloak, for instance, the unit cells on the periphery of the structure are designed to have an impedance that is nondispersive, while the impedances of the unit cells within the cloaking region change continuously as a function of the spatial coordinate at all operational frequencies. The waves thus neither reflect at the outside edge of the cloak nor inside the cloak due to the careful design of the outside edge unit cells and the gradually varying impedance. Integrating all of these constraints into the optimization algorithm, we arrive at a metamaterial element for which the refractive index value of the element can be directly related to its physical dimensions (or other physical parameters).

With the determined physical dimensions (or other physical parameters), in some approaches one may proceed to generate a large-scale mask of the entire layout for fabrication by printed circuit board (PCB) lithographic methods. For the exemplary ground plane cloak, the final mask, shown in FIG. 14, has more than thirty thousand unit cells with more than six thousand unique unit cells. The mask is generated, in this instance, by the same Matlab program that also performs the first two steps, so that the entire process—system and particle level designs, followed by layout and mask generation—are combined together. The Matlab program has calls to AutoCAD functions that draw all of the unit cells into the layout, producing the final mask.

Figure 14:
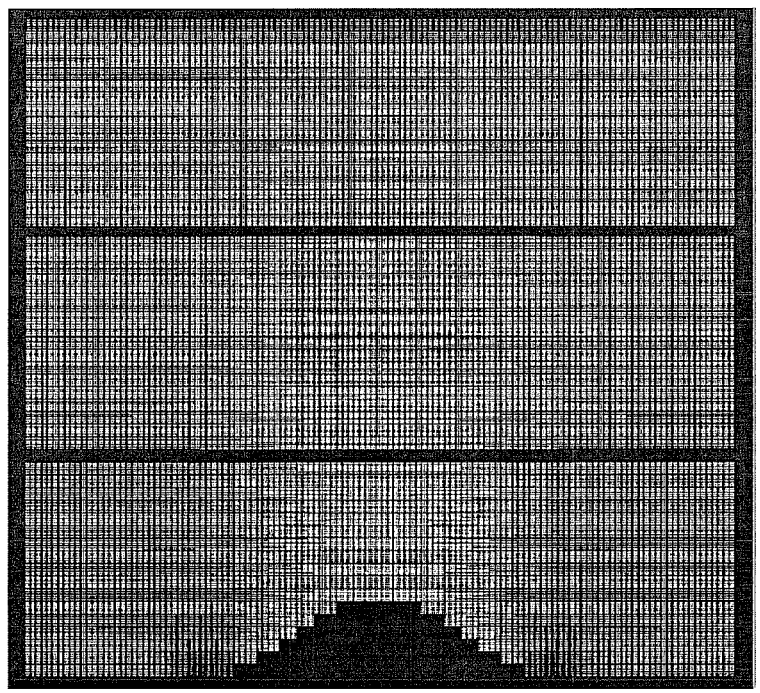
FIG. 14 is a diagram showing a ground-plane cloak mask (transformation region) generated by automatic design system according to an embodiment of the subject matter described herein.

FIG. 14 shows a ground-plane cloak mask (transformation region) generated by automatic design system. Not shown here are the cutting outlines, with slots for assembly, around which each strip (5 unit cells, 10 mm, in height) is cut out by circuit board prototype milling machine (LPRF).

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit a device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

All of the above U.S. patents, U.S. patent application publications. U.S. patent applications, foreign patents, foreign patent applications and non-patent publications referred to in this specification are incorporated herein by reference, to the extent not inconsistent herewith.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. An apparatus, comprising:
an interface structure having a front surface region and a back surface region, the interface structure being arranged to provide electromagnetic energy that is characteristic of an apparent profile of the back surface region substantially different than an actual profile of the back surface region for electromagnetic energy in a frequency range received at the front surface region, wherein the interface structure includes a plurality of elements having resonant frequencies outside of the frequency range, wherein the plurality of elements is arranged to provide a pattern of effective electromagnetic medium parameters that substantially corresponds to a coordinate transformation that maps the actual profile to the apparent profile.

2. The apparatus of claim 1, further comprising:
an electromagnetic reflector positioned adjacent to the back surface region.

3. The apparatus of claim 1, wherein the actual profile is a substantially nonplanar profile and the apparent profile is a substantially planar profile.

4. The apparatus of claim 1, wherein the actual profile is a first substantially nonplanar profile and the apparent profile is a second substantially nonplanar profile different than the first substantially nonplanar profile.

5. The apparatus of claim 1, wherein the interface structure includes an impedance matching layer positioned at least partially within the front surface region, the impedance matching layer being substantially nonreflective of electromagnetic energy received at the front surface region.

6. The apparatus of claim 5, wherein the impedance matching layer is characterized by an effective refractive index that gradiently approaches unity at an exterior surface of the impedance matching layer.

7. The apparatus of claim 1, wherein the interface structure is characterized by an effective refractive index that is not less than one.

8. The apparatus of claim 7, where the effective refractive index is substantially isotropic in two dimensions.

9. The apparatus of claim 7, where the effective refractive index is substantially isotropic in three dimensions.

10. The apparatus of claim 7, wherein the effective refractive index is substantially constant over the frequency range.

11. The apparatus of claim 10, wherein the frequency range includes a microwave frequency range.

12. The apparatus of claim 10, wherein the frequency range includes an optical frequency range.

13. The apparatus of claim 10, wherein the effective refractive index is a spatially-varying effective refractive index.

14. The apparatus of claim 13, wherein the plurality of elements have a plurality of respective individual electromagnetic responses substantially providing the effective refractive index.

15. The apparatus of claim 14, where the elements have varied respective physical parameters corresponding to varied respective individual electromagnetic responses, and the plurality of varied respective individual electromagnetic responses provides the spatially-varying effective refractive index.

16. The apparatus of claim 15, wherein the elements include I-shaped conducting elements and the varied respective physical parameters include geometrical parameters of the I-shaped conducting elements.

17. The apparatus of claim 15, wherein the elements include closed-ring conducting elements and the varied respective physical parameters include geometrical parameters of the closed-ring conducting elements.

18. The apparatus of claim 17, wherein the closed-ring conducting elements are substantially square closed-ring conducting elements.

19. The apparatus of claim 15, wherein the elements include conducting elements defining capacitive gaps and the varied respective physical parameters include capacitances of the capacitive gaps.

20. The apparatus of claim 15, wherein the elements include inductive-capacitive elements having inductive-capacitive resonance frequencies that substantially exceed the frequency range, and the varied respective physical parameters include impedances of the inductive-capacitive elements.

21. The apparatus of claim 20, wherein the impedances include capacitances.

22. The apparatus of claim 20, wherein the impedances include inductances.

23. The apparatus of claim 20, wherein the impedances include resistances.

24. A method, comprising:
receiving, at an interface structure including a plurality of elements with resonant frequencies outside of a frequency range, electromagnetic energy in the frequency range from one or more directions;
directing the electromagnetic energy toward a physical topography;
substantially independently of the one or more directions, transmitting the electromagnetic energy in a manner whereby the transmitted electromagnetic energy appears to be returned from an apparent topography different than the physical topography; and
propagating the electromagnetic energy through the interface structure according to a coordinate transformation that maps the actual topography to the apparent topography.

25. The method of claim 24, wherein the receiving is substantially non-reflectively receiving.

26. The method of claim 24, wherein the transmitting is substantially non-reflectively transmitting.

27. The method of claim 24, wherein the electromagnetic energy is microwave electromagnetic energy.

28. The method of claim 24, wherein the electromagnetic energy is radiowave electromagnetic energy.

29. The method of claim 24, wherein the electromagnetic energy is optical electromagnetic energy.

30. The method of claim 24, wherein a lower limit of the frequency range is substantially zero.

31. The apparatus of claim 1, wherein the coordinate transformation is a quasi-conformal coordinate transformation.

32. The method of claim 24, wherein the coordinate transformation is a quasi-conformal coordinate transformation.

33. An electromagnetic apparatus operable in a frequency range, comprising:
a metamaterial that includes a plurality of adjustable elements having resonant frequencies outside of the frequency range and having respective adjustable individual responses, the plurality of respective adjustable individual responses providing one or more adjustable effective medium parameters within the frequency range.

34. The electromagnetic apparatus of claim 33, wherein the one or more adjustable effective medium parameters includes an adjustable effective permittivity.

35. The electromagnetic apparatus of claim 33, wherein the one or more adjustable effective medium parameters includes an adjustable effective refractive index.

36. The electromagnetic apparatus of claim 33, wherein the adjustable elements are adjustable in response to one or more external inputs.

37. The electromagnetic apparatus of claim 36, wherein the one or more external inputs include one or more voltage inputs.

38. The electromagnetic apparatus of claim 36, wherein the one or more external inputs include one or more current inputs.

39. The electromagnetic apparatus of claim 36, wherein the one or more external inputs include one or more optical inputs.

40. The electromagnetic apparatus of claim 33, wherein the one or more adjustable effective medium parameters are substantially non-dispersive over the frequency range.

41. The electromagnetic apparatus of claim 40, wherein the adjustable elements are characterized by respective adjustable electric resonance frequencies that substantially exceed the frequency range.

42. The electromagnetic apparatus of claim 33, wherein the adjustable effective medium parameters are substantially determined by respective adjustable physical parameters of the adjustable elements.

43. The electromagnetic apparatus of claim 42, wherein the adjustable elements include conducting elements having capacitive gaps, and the respective adjustable physical parameters include adjustable capacitances of the capacitive gaps.

44. The electromagnetic apparatus of claim 42, wherein the adjustable elements include inductive-capacitive elements having inductive-capacitive resonance frequencies that substantially exceed the frequency range, and the respective adjustable physical parameters include adjustable impedances of the inductive-capacitive elements.

45. The electromagnetic apparatus of claim 44, wherein the adjustable impedances include adjustable capacitances.

46. The electromagnetic apparatus of claim 44, wherein the adjustable impedances include adjustable inductances.

47. The electromagnetic apparatus of claim 44, wherein the adjustable impedances include adjustable resistances.

48. The apparatus of claim 33, wherein a lower limit of the frequency range is substantially zero.

49. A method, comprising:
selecting an electromagnetic function; and
determining respective physical parameters for a plurality of elements having resonant frequencies outside of a frequency range, wherein the elements are positionable in a spatial arrangement to provide the electromagnetic function as an effective medium response of the elements over the frequency range, wherein the electromagnetic function is a cloaking function.

50. The method of claim 49, wherein the cloaking function defines an apparent surface of reflection different than an actual surface of reflection, and the selecting of the cloaking function includes selecting the apparent surface of reflection.

51. The method of claim 50, wherein the actual surface of reflection is a substantially nonplanar surface and the apparent surface of reflection is a substantially planar surface.

52. The method of claim 49, wherein the determining respective physical parameters includes determining according to one of a regression analysis and a lookup table.

53. The apparatus of method 49, wherein a lower limit of the frequency range is substantially zero.

54. A method, comprising:
selecting an electromagnetic function;
identifying a pattern of electromagnetic medium parameters suitable to provide the electromagnetic function; and
determining respective physical parameters for a plurality of elements having resonant frequencies outside of a frequency range, wherein the elements are positionable in a spatial arrangement to provide a pattern of effective electromagnetic medium parameters that substantially corresponds to the selected pattern of electromagnetic medium parameters for the frequency range; and wherein the selecting of the electromagnetic function includes selecting or computing a coordinate transformation that substantially defines the electromagnetic function.

55. The method of claim 54, wherein the coordinate transformation is a quasi-conformal coordinate transformation.

56. The method of claim 54, wherein the identifying of the pattern of electromagnetic medium parameters includes applying a transformation optical relation between the electromagnetic medium parameters and the coordinate transformation.

57. The method of claim 54, wherein the determining respective physical parameters includes determining according to one of a regression analysis and a lookup table.

58. The method of claim 54, wherein a lower limit of the frequency range is substantially zero.

59. A method, comprising:
selecting a pattern of electromagnetic medium parameters for a frequency range; and
for a plurality of adjustable elements with resonant frequencies outside of the frequency range, the elements having respective adjustable physical parameters and positioned in a spatial arrangement, determining respective values of the respective adjustable physical parameters to provide a pattern of effective electromagnetic medium parameters for the frequency range that substantially corresponds to the selected pattern of electromagnetic medium parameters.

60. The method of claim 59, wherein the respective adjustable physical parameters are determined by one or more control inputs, and the method includes_providing the one or more control inputs corresponding to the determined respective values of the respective adjustable physical parameters.

61. The method of claim 60, wherein the one or more control inputs includes one or more voltage inputs.

62. The method of claim 60, wherein the one or more control inputs includes one or more thermal inputs.

63. The method of claim 60, wherein the one or more control inputs includes one or more optical inputs.

64. The method of claim 59, wherein the adjustable elements include conducting elements having capacitive gaps, and the respective adjustable physical parameters include adjustable capacitances of the capacitive gaps.

65. The method of claim 59, wherein the adjustable elements include inductive-capacitive elements having inductive-capacitive resonance frequencies that substantially exceed the frequency range, and the respective adjustable physical parameters include adjustable impedances of the inductive-capacitive elements.

66. The method of claim 59, wherein a lower limit of the frequency range is substantially zero.

67. A method, comprising:
selecting an electromagnetic function; and
for a plurality of adjustable elements with resonant frequencies outside of a frequency range, the elements having respective adjustable physical parameters and positioned in a spatial arrangement, determining respective values of the respective adjustable physical parameters to provide the electromagnetic function as an effective medium response of the elements over the frequency range.

68. The method of claim 67, wherein a lower limit of the frequency range is substantially zero.

69. A method, comprising:
selecting an electromagnetic function;
identifying a pattern of electromagnetic medium parameters suitable to provide the electromagnetic function over a frequency range; and
for a plurality of adjustable elements with resonant frequencies outside of the frequency range, the elements having respective adjustable physical parameters and positioned in a spatial arrangement, determining respective values of the respective adjustable physical parameters to provide a pattern of effective electromagnetic medium parameters that substantially corresponds to the selected pattern of electromagnetic medium parameters.

70. The apparatus of claim 1, wherein a lower limit of the frequency range is substantially zero.

71. The apparatus of claim 69, wherein a lower limit of the frequency range is substantially zero.

* * * * *